(12) United States Patent
Taghavi Nasrabadi et al.

(10) Patent No.: US 12,327,314 B1
(45) Date of Patent: Jun. 10, 2025

(54) VARIABLE TRANSPARENCY LAYERS FOR LIGHT-WEIGHT RENDERING

(71) Applicant: Apple Inc., Cupertino, CA (US)

(72) Inventors: Afshin Taghavi Nasrabadi, Sunnyvale, CA (US); Maneli Noorkami, Sunnyvale, CA (US); Michael Stecklein, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 397 days.

(21) Appl. No.: 17/804,799

(22) Filed: May 31, 2022

Related U.S. Application Data

(60) Provisional application No. 63/217,261, filed on Jun. 30, 2021.

(51) Int. Cl.
*G06T 17/20* (2006.01)
*G06T 7/55* (2017.01)
*G06T 9/00* (2006.01)

(52) U.S. Cl.
CPC .............. *G06T 17/205* (2013.01); *G06T 7/55* (2017.01); *G06T 9/001* (2013.01); *G06T 2207/20021* (2013.01)

(58) Field of Classification Search
CPC ......... G06T 17/205; G06T 7/55; G06T 9/001; G06T 2207/20021
See application file for complete search history.

(56) References Cited

U.S. PATENT DOCUMENTS

| | | | |
|---|---|---|---|
| 9,529,427 B2 | 12/2016 | Raghoebardayal et al. | |
| 9,883,161 B2 | 1/2018 | Tian et al. | |
| 10,628,995 B2 | 4/2020 | Chen et al. | |
| 11,055,879 B1 | 7/2021 | Strandborg et al. | |
| 11,170,215 B1 | 11/2021 | Sieracki | |

(Continued)

FOREIGN PATENT DOCUMENTS

| | | |
|---|---|---|
| CN | 108846875 | 11/2018 |
| CN | 114782616 | 9/2022 |

(Continued)

OTHER PUBLICATIONS

U.S. Appl. No. 17/804,801, filed May 31, 2022, Maneli Noorkami, et al.

(Continued)

*Primary Examiner* — Samir A Ahmed
(74) *Attorney, Agent, or Firm* — Alexander A. Knapp; Kowert, Hood, Munyon, Rankin & Goetzel, P.C.

(57) ABSTRACT

A decoding computing device receives a bit stream for compressed volumetric visual content, such as immersive media. The bit stream includes video encoded image frames comprising packed attribute patch images, depth maps for a 3D scene represented by the volumetric visual content, and a variable transparency layer indicating boundaries of objects at different depths within the 3D scene represented by the volumetric visual content. Instead of generating a mesh having a large number of vertices, the decoder generates a lower resolution mesh and applies the variable transparency layer, such that portions of triangles or polygons of the lower resolution mesh extending beyond the boundaries of the objects at the different depths of the 3D scene are made transparent and not shown as being stretched across large depth distances.

20 Claims, 16 Drawing Sheets

(56) References Cited

U.S. PATENT DOCUMENTS

| | | | |
|---|---|---|---|
| 11,250,612 B1* | 2/2022 | Medina | H04N 13/189 |
| 11,861,788 B1 | 1/2024 | Taghavi Nasrabadi | |
| 11,948,338 B1 | 4/2024 | Mammou | |
| 2007/0183649 A1 | 8/2007 | Kiefer | |
| 2012/0058823 A1 | 3/2012 | Minato | |
| 2013/0300656 A1 | 11/2013 | Roegelein | |
| 2013/0335416 A1 | 12/2013 | Coon | |
| 2017/0018121 A1 | 1/2017 | Lawson | |
| 2018/0035134 A1 | 2/2018 | Pang | |
| 2018/0130255 A1 | 5/2018 | Hazeghi | |
| 2018/0192058 A1 | 7/2018 | Chen | |
| 2018/0262745 A1* | 9/2018 | Cole | H04N 13/25 |
| 2020/0045285 A1 | 2/2020 | Varerkar | |
| 2020/0077124 A1 | 3/2020 | Shi | |
| 2020/0177868 A1 | 6/2020 | Varekamp | |
| 2021/0029340 A1 | 1/2021 | Wu | |
| 2021/0067840 A1 | 3/2021 | Mate | |
| 2021/0099686 A1* | 4/2021 | Panchagnula | H04N 19/597 |
| 2021/0258554 A1 | 8/2021 | Bruls | |
| 2022/0078396 A1 | 3/2022 | Gul | |
| 2022/0094909 A1 | 3/2022 | Hannuksela | |
| 2024/0223767 A1 | 7/2024 | Yang et al. | |

FOREIGN PATENT DOCUMENTS

| | | |
|---|---|---|
| CN | 111861632 | 6/2023 |
| CN | 116681860 | 9/2023 |
| WO | WO 2011087289 A2 * | 7/2011 |
| WO | 2023110562 | 6/2023 |

OTHER PUBLICATIONS

U.S. Appl. No. 17/691,691, filed Mar. 10, 2022, Khaled Mammou, et al.

\* cited by examiner

*Atlas comprising packed attribute patch images for main views and non-redundant pixels of remaining views*

*Atlas comprising packed depth patch images for main views and non-redundant pixels of remaining views*

Encoder block diagram

VARIABLE TRANSPARENCY LAYERS FOR LIGHT-WEIGHT RENDERING

BACKGROUND

This application claims benefit of priority to U.S. Provisional Application Ser. No. 63/217,261, entitled "Variable Transparency Layers for Light-Weight Rendering," filed Jun. 30, 2021, and which is hereby incorporated herein by reference in its entirety.

TECHNICAL FIELD

This disclosure relates generally to compression and decompression of volumetric visual content, such as immersive media content.

DESCRIPTION OF THE RELATED ART

In some circumstances, three-dimensional (3D) volumetric content is generated using images captured by multiple cameras positioned at different camera angles and/or different locations relative to an object or scene to be captured. The 3D volumetric content includes attribute information for the object or scene, such as color information (e.g. RGB values) or texture information. The 3D volumetric content also includes geometry information for the object or scene, such as depth values for surfaces of the object or depth values for items in the scene. Such 3D volumetric content may make up "immersive media" content, which in some cases may comprise a set of views each having associated spatial information (e.g. depth) and associated attributes. Such 3D volumetric content may include large amounts of data and may be costly and/or time-consuming to render at a decoding device.

SUMMARY OF EMBODIMENTS

In some embodiments, a plurality of images captured from a plurality of camera angles are received by an encoder. Based on the received images, the encoder generates an atlas comprising attribute values, such as colors, textures, etc. for views of the 3D scene along with a corresponding depth map comprising depth values for the views of the 3D scene. Additionally, the encoder generates a transparency layer comprising transparency values that indicate one or more boundaries of one or more objects in the 3D scene, or a boundary of the one or more objects in a given depth interval of the 3D scene, when the transparency layer is applied to portions of the atlas comprising the attribute information, or when the transparency layer is applied to portions of the depth map comprising the depth values.

For example, when rendering a portion of the 3D scene using the depth map, a decoder may generate a mesh comprising polygons or triangles, wherein at least some polygons or triangles extend beyond a boundary of an object in the 3D scene, or beyond a boundary of the object in a given depth interval of the 3D scene. When transparency layers are used, instead of requiring such objects to be rendered with smaller polygons in order to avoid or reduce an amount to which the polygons or triangles extend beyond the boundaries of the object in the 3D scene or the given depth interval (e.g. a higher resolution mesh), the decoder may instead render the object using a lower resolution mesh and may apply a transparency layer indicating the boundaries of the object such that portions of the polygons or triangles that extend beyond the boundaries of the object are hidden when rendered using the lower resolution mesh. For example, the transparency layer may hide the portions of the polygons or triangles that extend beyond the borders of the object, but may be transparent in relation to other portions of the polygons or triangles that are within the borders of the object. Thus, the transparency layer may make portions of the triangles or polygons outside the borders/boundaries transparent, when applied in a rendering process such that larger polygons or triangles may be used to render the object without distorting edges of the object that have triangles extending beyond the borders of the object.

As another example, if the larger polygons or triangles were to be used without applying a transparency layer to make portions the polygons or triangles that cross an object's borders transparent, such polygons or triangles may appear stretched in a reconstructed representation. For example, the polygons or triangles may appear stretched from a foreground depth of the object to a background depth of the 3D scene behind the object. This stretching may distort a reconstructed representation of the 3D object or scene. However, by applying a transparency layer as described herein, such larger polygons or triangles extending across the object boundaries may be made transparent, such that the remaining portions of the polygons or triangles (e.g. non-transparent portions) stay in the foreground with the object and the portions extending beyond the object boundaries are not visible (e.g. are made transparent). This may prevent these portions of the polygons or triangles from being shown as stretched to the background depth, thus reducing distortion in a reconstructed representation of the 3D scene.

In some embodiments, a variable transparency layer comprises transparency values corresponding to pixels of the depth map that fall within a boundary of a given object in a 3D scene. The transparency values of the transparency layer within the boundaries of the given object may have same transparency values or smooth transitions between respective ones of the transparency values. Additionally, a variable transparency layer may comprise transparency values corresponding to pixels of a depth map for a portion of the depth map that crosses the boundary of the given object. The transparency values of the transparency layer that cross object boundaries may have sharp transitions between respective ones of the transparency values. For example there may be a sharp transition between transparency values corresponding to pixels within the boundary of the given object and other transparency values corresponding to pixels outside of the boundary of the given object. In some embodiments, an encoder may encode attribute values of an atlas, depth values of a depth map, and transparency values of a transparency layer to generate a compressed bit stream representing volumetric visual content, such as a 3D object or scene.

In some embodiments, an encoder further determines depth intervals for a 3D scene and generates different variable transparency layers for different ones of the depth intervals. For example, a depth interval comprising the example object from above that is located in the foreground may have an associated variable transparency layer and another depth interval, for example including an object behind the foreground, may have a different associated variable transparency layer. In this way boundaries for objects located at different depths in the 3D scene may be indicated using different variable transparency layers. Also, in some embodiments, a single variable transparency layer for a given depth interval may indicate boundaries of more than one object in the given depth interval of the 3D scene.

In some embodiments, a decoder additionally divides a 3D scene into blocks and determines variable transparency layers for respective ones of the blocks. For example, if only a portion of the blocks of the 3D scene include objects with depth values falling within a first depth interval, the unoccupied blocks (e.g. blocks that do not include any pixels representing depth values within the first depth interval) may be discarded. Additionally, no attribute block may be generated for blocks of the first depth interval that correspond to unoccupied depth blocks. Likewise, a variable transparency layer for the first depth interval may omit the unoccupied blocks. Other blocks of the first depth interval that are fully occupied (e.g, wherein all pixel values of the depth block have depth values falling within the depth interval for the first block) may be encoded along with corresponding attribute blocks. Also, a variable transparency layer block may be generated for the fully occupied block, wherein the variable transparency layer block uses a same or similar transparency values for all of the pixels of the fully occupied block. Yet other blocks of the first depth interval that are partially occupied (e.g. including some pixels with depth values falling within in the first depth interval and including other pixels that do not include depth values in the first depth interval), may be encoded along with corresponding attribute blocks. Also, variable transparency layer blocks corresponding to the partially occupied blocks may be generated, wherein the variable transparency blocks for the partially occupied blocks use highly contrasted transparency values to indicate one or more boundaries of an object with depth values represented by the occupied pixels of the partially occupied blocks.

In some embodiments, a segmentation process may be performed prior to determining the depth intervals and blocks. Portions of the 3D scene with depth gradients less than a threshold depth gradient may be included in one or more segments. Additionally, corresponding masks may be generated representing the one or more segments. The masks may be applied at an encoder and at a decoder to exempt the masked segments from the above considerations. For example, instead of evaluating blocks for the full 3D scene, the encoder and decoder may use a uniform mesh resolution and texture resolution on the masked segments without generating or applying a variable transparency layer. But, for other portions of the 3D scene not included in the segments and not covered by the corresponding masks, the encoder and decoder may perform a block evaluation procedure for one or more depth intervals as described above. Also, in some embodiments more than one mesh resolution and texture resolution may be used for the masked segments without generating or applying a variable transparency layer for the masked segments.

In some embodiments, an encoder may further pack sets of depth interval blocks generated for each of the two or more depth intervals into an updated atlas and an updated depth map. For example, a set of depth interval blocks may include depth blocks and attribute blocks for a given depth interval along with variable transparency blocks for the given depth interval. The attribute blocks for multiple depth intervals may be packed into an updated atlas. Also, the depth blocks for the multiple depth intervals may be packed into an updated depth map. Note that because some blocks of an original atlas and an original depth map may include pixels falling within multiple depth intervals, multiple sets of depth interval blocks (one for each occupied depth interval) may be generated from the original atlas and the original depth map blocks. The original atlas described above refers to the atlas that is initially generated with an original depth map, wherein the original atlas and the original depth map describe the attributes and depth values for the 3D scene. This depth map is then used to determine the depth intervals used in determining the transparency layers. Thus the updated atlas and updated depth map refer to a version of the atlas and depth map, wherein depth layers that were previously represented together in the original atlas and the original depth map have been separated out into different respective blocks of the updated atlas and updated depth map for different respective depth layers in regard to portions of the 3D scene that have objects in more than one depth layer. Thus, the updated atlas and corresponding updated depth map may include more blocks than the original atlas and the corresponding original depth map. Additionally, a variable transparency atlas comprising the variable transparency blocks generated for the evaluated blocks of the depth intervals may be included in a bit stream with the updated atlas and the corresponding updated depth map.

In some embodiments a decoder receives a bit stream representing a compressed representation of a three-dimensional (3D) scene, wherein the bit stream comprises an atlas (or updated atlas) comprising attribute values for views of the 3D scene, a depth map (or updated depth map) comprising depth values for views of the 3D scene, and a variable transparency layer comprising transparency values that indicate one or more boundaries of one or more objects in the 3D scene. (Note that from the perspective of the decoder the updated atlas generated at the encoder and the updated depth map generated at the encoder may be simply referred to as an atlas and a depth map received at the decoder). The decoder generates one or more meshes representing one or more portions of the 3D scene based on the depth map. The decoder also generates one or more corresponding textures for the one or more portions of the 3D scene based on the atlas. Furthermore, the decoder applies the variable transparency layer to the generated one or more meshes and the generated one or more corresponding textures to eliminate portions of the meshes or textures that, when rendered from the depth map or atlas, stretch beyond the one or more boundaries of the one or more objects in the 3D scene. The decoder then reconstructs the 3D scene using the generated one or more meshes and the generated one or more corresponding texture to which the variable transparency layer has been applied.

A device includes a memory storing program instructions and one or more processors configured to execute the program instructions. The program instructions, when executed on or across the one or more processors, cause the one or more processors to generate an atlas comprising attribute values for views of a three-dimensional (3D) scene based on a plurality of images of a three-dimensional (3D) scene. Additionally, the program instructions cause the one or more processors to generate a depth map comprising depth values for the views of the 3D scene based on the plurality of images of the 3D scene. In some embodiments, the depth values to be included in the depth map may be received as an input or may be generated based on the plurality of images, such as by matching portions of the images having similar color values and then using information known about viewing angles from which the plurality of images were captured to calculate depth values. Furthermore, the program instructions cause the one or more processors to generate a variable transparency layer comprising transparency values that indicate one or more boundaries of one or more objects in the 3D scene. The transparency values of the variable transparency layer that correspond to pixels of the depth map falling within a boundary of a given object in the 3D scene have same transparency values or smooth transitions between respective ones of the transparency values corresponding to the pixels of the depth map falling within the boundary of the given object and the transparency values of the transparency layer that correspond to pixels of the depth map that cross the boundary of the given object have sharp transitions between respective ones of the transparency values corresponding to pixels within the boundary of the given object and other transparency values corresponding to pixels outside of the boundaries of the given object. Also, the program instructions cause the one or more processors of the device to encode the attribute values of the atlas, encode the depth values of the depth map, and encode the transparency values of the transparency layer.

Figure 1A:
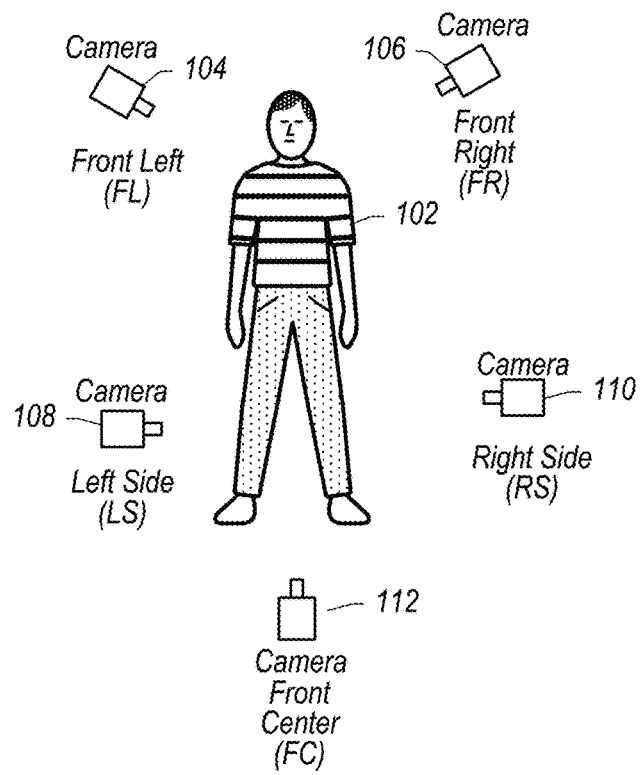
FIG. 1A illustrates a front view of a plurality of cameras located at different locations and/or camera angles relative to an object or scene, wherein the cameras capture images of the object or scene, and wherein the captured images are used to generate three-dimensional volumetric content representing the object or scene, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112 (f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

As data acquisition and display technologies have become more advanced, the ability to capture three-dimensional (3D) volumetric content, such as immersive video content, has increased. Also, the development of advanced display technologies, such as augmented reality, has increased potential uses for volumetric visual content, such as immersive video. However, volumetric visual content may include large amounts of data and may be costly and time-consuming to store and transmit. Also, volumetric visual content may be computationally intensive to render at display devices. For example, such volumetric visual content may require generating and rendering a large number of vertices which may consume considerable amounts of computational capacity of a given rendering device and/or may increase rendering time. Development of other display technologies, such as virtual reality, mixed reality, so forth, share in these challenges.

In some embodiments, an encoder may be used to generate a compressed version of the volumetric visual content. In some embodiments, a system may include an encoder that compresses attribute and/or spatial information of volumetric visual content, such as a 3D volumetric point cloud or immersive video content, such that the volumetric visual content may be stored and transmitted more quickly than non-compressed volumetric visual content and in a manner such that the compressed volumetric visual content occupies less storage space than non-compressed volumetric visual content. In some embodiments, such compression may enable volumetric visual content to be communicated over a network in real-time or in near real-time, on-demand responsive to user instructions.

In some embodiments, a system may include a decoder that receives encoded volumetric visual content comprising video encoded attribute information, video encoded geometry information, and video encoded variable transparency information via a network from a remote server or other storage device that stores or generates the volumetric visual content. For example, in some embodiments, a decoder may include a 3D display, a holographic display, or a head-mounted display that may be manipulated in real-time or near real-time to show different portions of a virtual world represented by volumetric visual content. In order to update the 3D display, the holographic display, or the head-mounted display, a system associated with the decoder may request data from a remote server based on user manipulations (or anticipated user manipulations) of the displays, and the data may be transmitted from the remote server to the decoder in a form of encoded volumetric visual content (e.g. video encoded attribute patch images, video encoded depth patch images or depth maps, and video encoded variable transparency layers). The display may then be updated with updated data responsive to the user manipulations, such as updated views.

However, instead of rendering a mesh representing a 3D object or scene that includes a vertex for each pixel included in a depth patch images or a depth map, a decoding computing device (e.g. decoder) may simplify the mesh. For example, a decoder may generate vertices for only a sub-set of the depth values indicated by pixels of the depth path images or the depth map. This may lead to a lower resolution mesh being generated that includes larger polygons or triangles. Such a lower resolution mesh may use less computational resources to render at the decoding computing device than a higher resolution mesh. Alternatively, or additionally, an encoding computing device (e.g. encoder) may encode the depth map using a lower resolution of pixels such that fewer mesh vertices are generated by a decoder, and such that a rendered mesh has a lower resolution of vertices and includes larger polygons or triangles, than would have been the case if a higher resolution of pixels was included in the depth map (not taking into account subsampling at the decoder).

A consequence of using a lower mesh resolution is that polygons or triangles that extend across considerable depth gradients, such as a triangle extending across a boundary of an object in the foreground and into a background portion of a 3D scene, may be stretched when rendered. For example, one or more vertices of the triangle may be assigned depth values in the foreground while one or more remaining vertices of the triangle are assigned a depth value in the background. Thus, the triangle may be stretched from the foreground to the background. This may distort a reconstructed representation of the 3D scene. Also, even without using a lower resolution mesh, there are instances where triangles of objects in the foreground are stretched into the background because a triangle extends beyond a boundary of the foreground object. Using a lower resolution mesh may increase the effects of such stretching, because the triangles are larger and more likely to cross over object boundaries. However, applying a variable transparency layer may avoid such distortion due to stretching of polygons or triangles across large depth gradients. Also, applying a variable transparency layer allows for shapes of objects to be accurately reconstructed, for example on boundaries that include triangles that extend beyond the boundary. This is done by removing the portions of the triangles extending beyond the boundary by applying the variable transparency layer. For example, in some embodiments, multiple depth intervals are determined for a 3D scene and a variable transparency layer is generated for each depth interval. The transparency values of a given variable transparency layer indicate boundaries of objects within a corresponding depth interval. As an example, a variable transparency layer for a given depth interval may be overlaid on a mesh generated for an object. However, in contrast to the example described above where a triangle of a rendered mesh for an object has one or more vertices extending beyond the boundaries of the object (such that the triangle is stretched to the background), the variable transparency layer may be applied to make a portion of the triangle extending beyond the boundaries of the object in the given depth interval transparent. Thus, instead of appearing stretched to the background, the portion of the triangle extending beyond the boundaries of the object in the foreground is omitted. Additionally, depth values for the background such as are included in another depth interval, include depth values for generating a mesh triangle in the background, wherein a portion of the mesh triangle in the background extending beyond the boundaries of the background and into the foreground is made transparent (and therefore prevented from appearing stretched to the foreground).

In some embodiments, both attribute blocks and depth blocks are generated for each depth interval, wherein blocks of an original depth map that include depth values falling within a given depth interval are used to generate a depth block for the given depth interval. Also, a corresponding attribute block for the depth block is generated for the given depth interval. Again, taking the example of the boundary of the object in the foreground, such a block of an original depth map may include some depth values in a first depth interval (such as the foreground) and other depth values in another depth interval (such as the background). Thus two sets of depth interval blocks may be generated for the single block in the original depth map and original atlas. Continuing the example, for the first depth interval (e.g. foreground), a depth block including depth values of the original depth map block that fall within the first depth interval are included in a depth block for the first depth interval. Also, an attribute block for the first depth interval is generated having attribute values for pixels of the attribute block that correspond to the occupied pixels of the depth block (e.g. the pixels of the depth block that have depth values falling in the first depth interval). Additionally, a variable transparency block is generated indicating the boundary of the depth interval. For example, the variable transparency block may be generated by assigning sharply contrasting transparency values to pixels corresponding to pixels of the depth block that cross a depth boundary. For example, pixels with depth values in the background may be indicated in the variable transparency layer as having a value of 0 (e.g. black) and pixels with depth values in the foreground may be indicated in the variable transparency layer as having a value of 1 (e.g. white), or vice versa. Thus the contrast between the pixels of the variable transparency layer indicates the boundaries of the objects in the depth interval and may be used to make polygons or triangles extending beyond the boundaries transparent.

In some embodiments, as part of generating the volumetric visual content, sensors may capture attribute information for one or more points, such as color attributes, texture attributes, reflectivity attributes, velocity attributes, acceleration attributes, time attributes, modalities, and/or various other attributes. For example, in some embodiments, an immersive video capture system, such as that may follow MPEG immersive video (MIV) standards, may use a plurality of cameras to capture images of a scene or object from a plurality of viewing angles and/or locations and may further use these captured images to determine spatial information for points or surfaces of the object or scene, wherein the spatial information and attribute information is encoded using video-encoded attribute image patches, video encoded depth patch images/depth maps, and video encoded variable transparency layers, as described herein.

Generating Volumetric Visual Content

In some embodiments, volumetric visual content that is to be encoded and/or compressed and decoded and/or decompressed, as described herein, may be generated from a plurality of images of an object or scene representing multiple views of the object or scene, wherein additional metadata is known about the placement and orientation of the cameras that captured the multiple views.

For example, FIG. 1A illustrates an object and/or scene (e.g. person 102) for which multiple images are being captured representing multiple views of the object and/or scene, when viewed from cameras located at different locations and viewing angles relative to the object and/or scene. Note that for simplicity of example person 102 is represented as a single object. However, in some embodiments, a scene may comprise multiple objects, such as person 102 and a surrounding environment comprising other objects, such as furniture, trees, other people, etc.

In FIG. 1A cameras 104, 106, 108, 110, and 112 view person 102 from different camera locations and/or viewing angles. For example, camera 112 captures a front center (FC) view of person 102, camera 108 captures a left side (LS) view of person 102, camera 110 captures a right side (RS) view of person 102, camera 104 captures a front left (FL) view of person 102, and camera 106 captures a front right (FR) view of person 102.

Figure 1B:
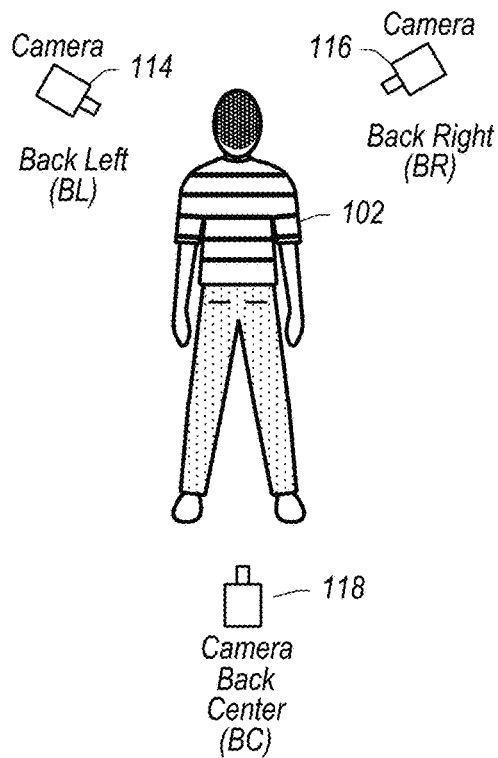
FIG. 1B illustrates a back view showing additional cameras located at different locations and/or camera angles relative to the object or scene, wherein the additional cameras capture images of the object or scene that are used to generate the three-dimensional volumetric content representing the object or scene, according to some embodiments.

FIG. 1B illustrates additional cameras that may be located behind person 102. For example, camera 118 captures a back center (BC) view of person 102, camera 114 captures a back left (BL) view of person 102, camera 116 captures a back right (BR) view of person 102, etc.

Figure 1C:
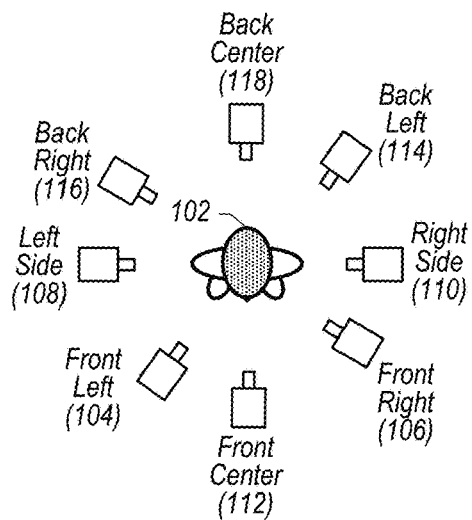
FIG. 1C illustrates a top view showing the cameras and the additional cameras located at the different locations and/or camera angles relative to the object or scene, wherein the cameras and the additional cameras capture the images of the object or scene that are used to generate the three-dimensional volumetric content representing the object or scene, according to some embodiments.

FIG. 1C is a top view illustrating the cameras shown in FIGS. 1A and 1B that are located at different locations and viewing angles relative to person 102. Note that the camera positions and camera angles shown in FIGS. 1A-1C are given as an example configuration and in some embodiments other camera configurations may be used. For example, in some embodiments, when capturing images for a scene, the cameras may face outward towards the scene as opposed to pointing inward towards an object, as shown in FIG. 1C. Also, in some embodiments, the cameras may not necessarily be arranged in a circular configuration, but may instead be arranged in other configurations, such as a square, rectangle, grid pattern, etc.

Figure 1D:
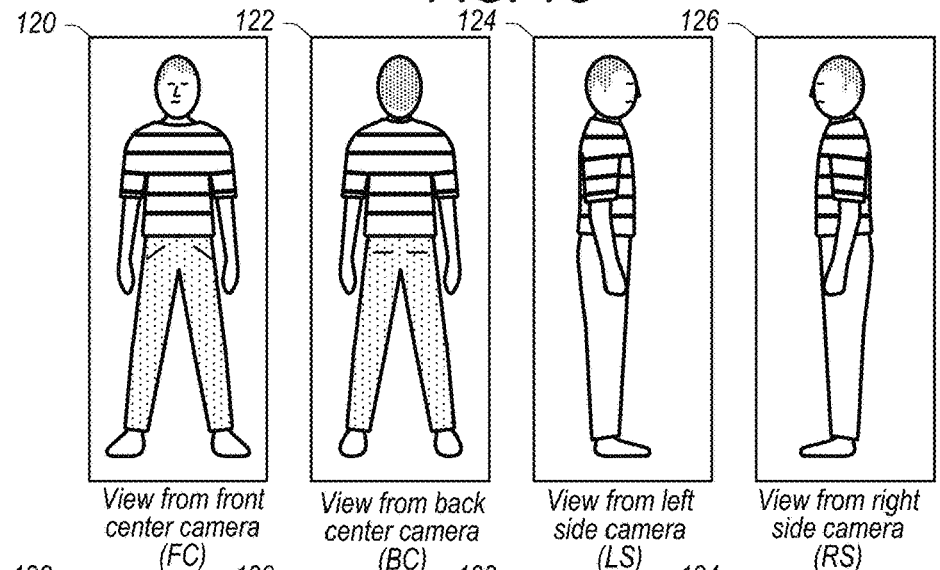
FIG. 1D illustrates respective views of the object or scene captured by the cameras and the additional cameras located at the different locations and/or camera angles relative to the object or scene, according to some embodiments.
Figure 1D:
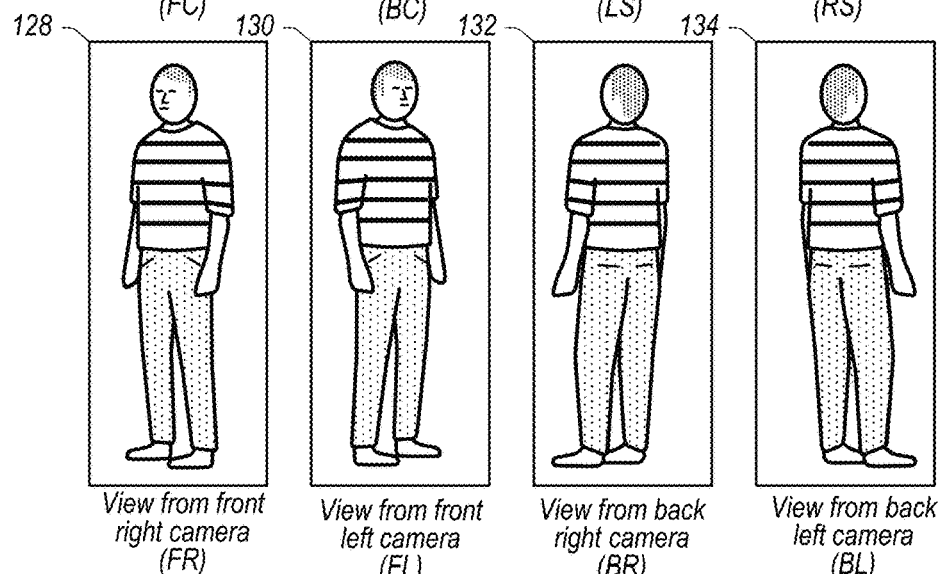

FIG. 1D illustrates images that may have been captured via cameras 104-118 as shown in FIGS. 1C-1D. For example image 120 shows a front center (FC) view, image 122 shows a back center (BC) view, image 124 shows a left side (LS) view, image 126 shows a right side (RS) view, image 128 shows a front right (FR) view, image 130 shows a front left (FL) view, image 134 shows a back right (BR) view, and image 134 shows a back left (BL) view.

In some embodiments, metadata is associated with each of the views as shown in FIG. 1D, wherein the metadata (e.g. source camera parameters) indicate locations and camera angles for the respective cameras 104-118 that were used to capture images 120-134. In some embodiments, this metadata may be used to determine geometry information for the object or scene that is being captured by the respective cameras, such as X, Y, and Z coordinates of points of the object or scene (or other types of spatial information).

Figure 5:
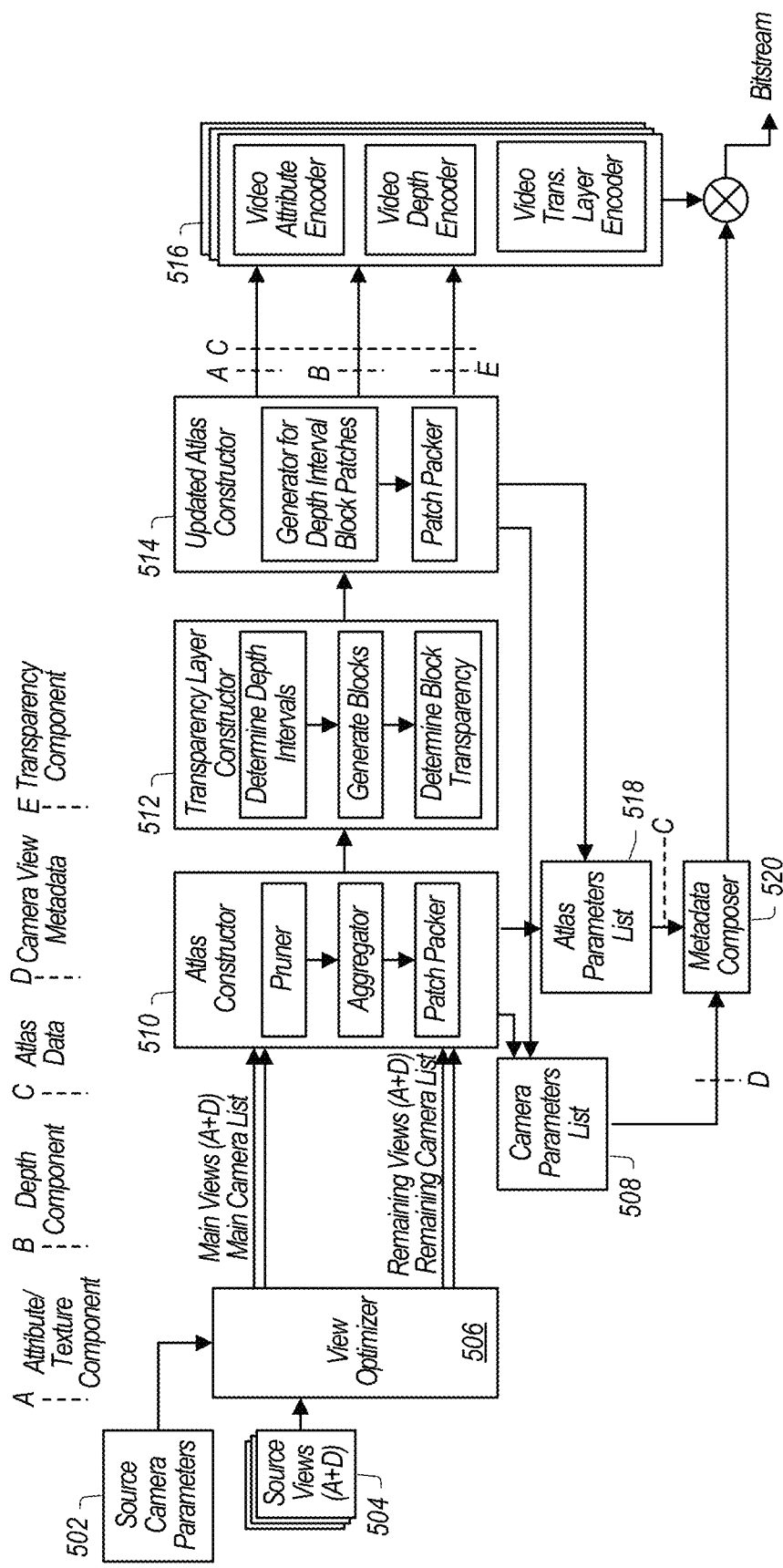
FIG. 5 illustrates a block diagram for an encoder configured to encode three-dimensional (3D) volumetric content using variable transparency layers, according to some embodiments.

For example, a component of an encoder, such as an atlas constructor 510 (as shown in FIG. 5) may use source camera parameters (e.g. metadata indicating source camera parameters 502, such as camera location and orientation) along with the images captured from the cameras to determine distances to surfaces in the captured images from the cameras at the known locations with the known orientations. In turn, spatial information indicating locations in space for the surfaces may be determined using the determined distances from the cameras and the known locations and orientations of the cameras.

Figure 2:
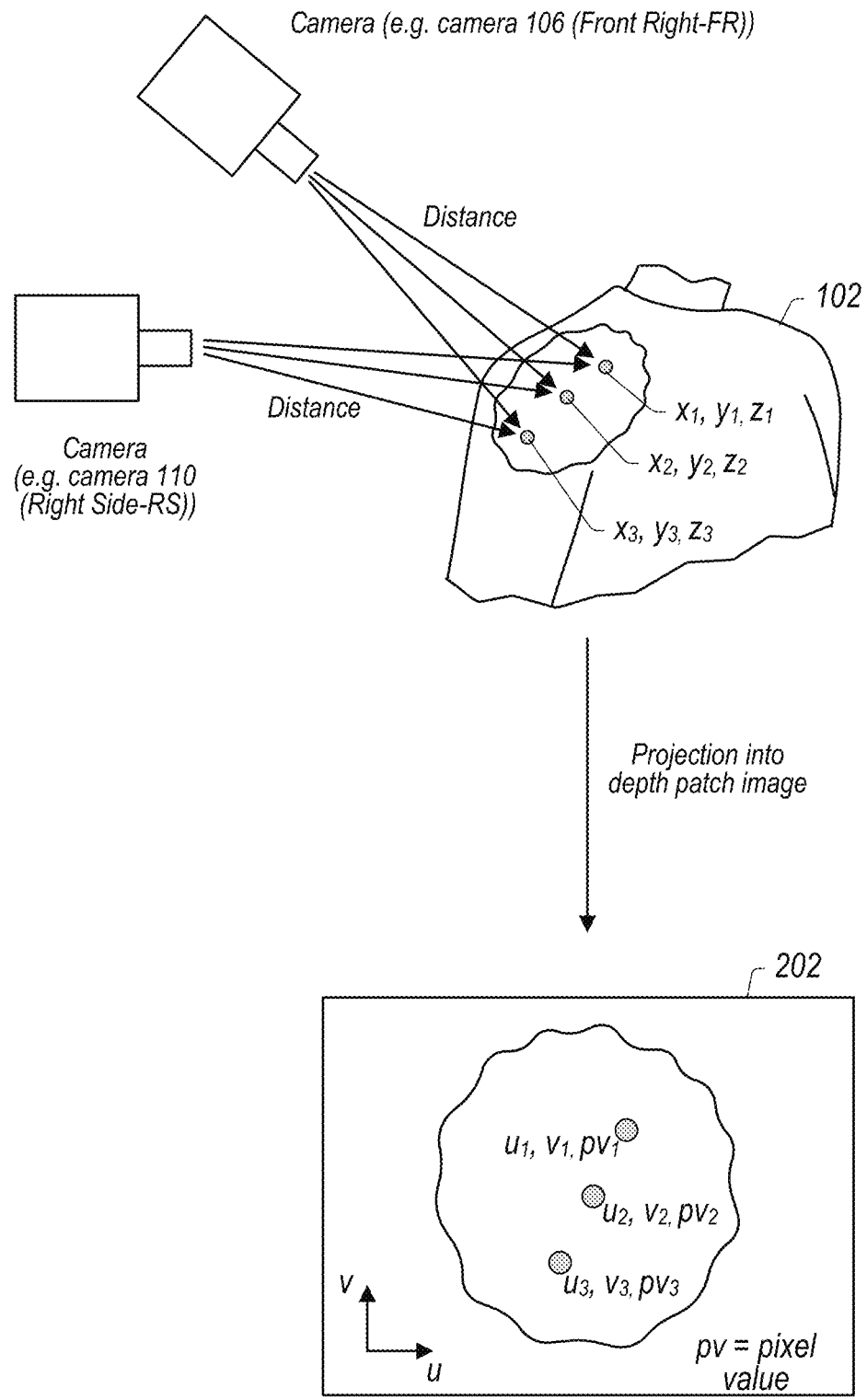
FIG. 2 illustrates depth values for a depth patch image being determined using camera location and camera angle information for multiple cameras that capture images for a same portion of the object or scene from the different locations and/or camera angles, according to some embodiments.

For example, as shown in FIG. 2, source camera parameters 502 may indicate locations and orientations for right side camera 110 and front right camera 106 that both capture images of a portion of a shoulder of person 102. Moreover, the atlas constructor 510 may determine that the cameras 106 and 110 are both capturing images comprising a same surface of the object (e.g. the portion of the person's shoulder). For example, pixel value patterns in the images may be matched to determine that images from both cameras 106 and 110 are capturing the same portion of the person 102's shoulder. Using the source camera parameters 502 and knowing points in the captured images that are located at a same location in 3D space, the atlas constructor 510 may determine a location in 3D space of the matching portions of the captured images (e.g. the portion of person 102's shoulder). Based on this determination using the known locations and orientations of cameras 106 and 110, the atlas constructor 510 may determine geometry/spatial information for the portion of the object, such as X, Y, and Z coordinates for points included in the matching portion of the person 102's shoulder.

Furthermore, the spatial/geometry information may be represented in the form of a depth map (also referred to herein as a depth patch image). For example, the spatial information for the person's shoulder, e.g. points with coordinates $X_1, Y_1, Z_1$; $X_2, Y_2, Z_2$; and $X_3, Y_3, Z_3$, may be projected onto a flat plane of a depth map, wherein the X and Y spatial information is represented by a location of a given point in the depth map. For example, X values may be represented by locations of the points along a width of the depth map (e.g. the "U" direction) and Y values may be represented by locations of the points along the height of the depth map (e.g. the "V" direction). Moreover, the Z values of the points may be represented by pixel values ("pv") associated with the points at locations (U,V). For example, a first point with coordinates in 3D space of $X_1, Y_1, Z_1$ may be represented in the depth map at pixel $(U_1, V_1)$ which has pixel value $pv_1$, wherein darker pixel values indicate lower Z values and lighter pixel values indicate greater Z values (or vice versa).

In some embodiments, depth maps may only be signaled in a bit stream for views that are to be included in an atlas. For example, depth maps generated for redundant views or redundant portions of views that are omitted from the atlas may be omitted from a bit stream communicating the atlas and corresponding depth map. Though, in some embodiments, image data and source camera parameters of all views may be used to generate the depth maps, but the redundant views may not be included in the bit stream. For example, whereas cameras 106 and 110 capture redundant information for the person 102's shoulder, a single depth map may be signaled for the two views as opposed to generating two redundant depth maps for the person's shoulder. However the images captured from cameras 106 and 110 that redundantly view the person's shoulder from different locations/camera viewing angles may be used to determine the spatial information to be included in the single depth map representing the person's shoulder.

Encoding Volumetric Visual Content with Variable Transparency Layers

Figure 3:
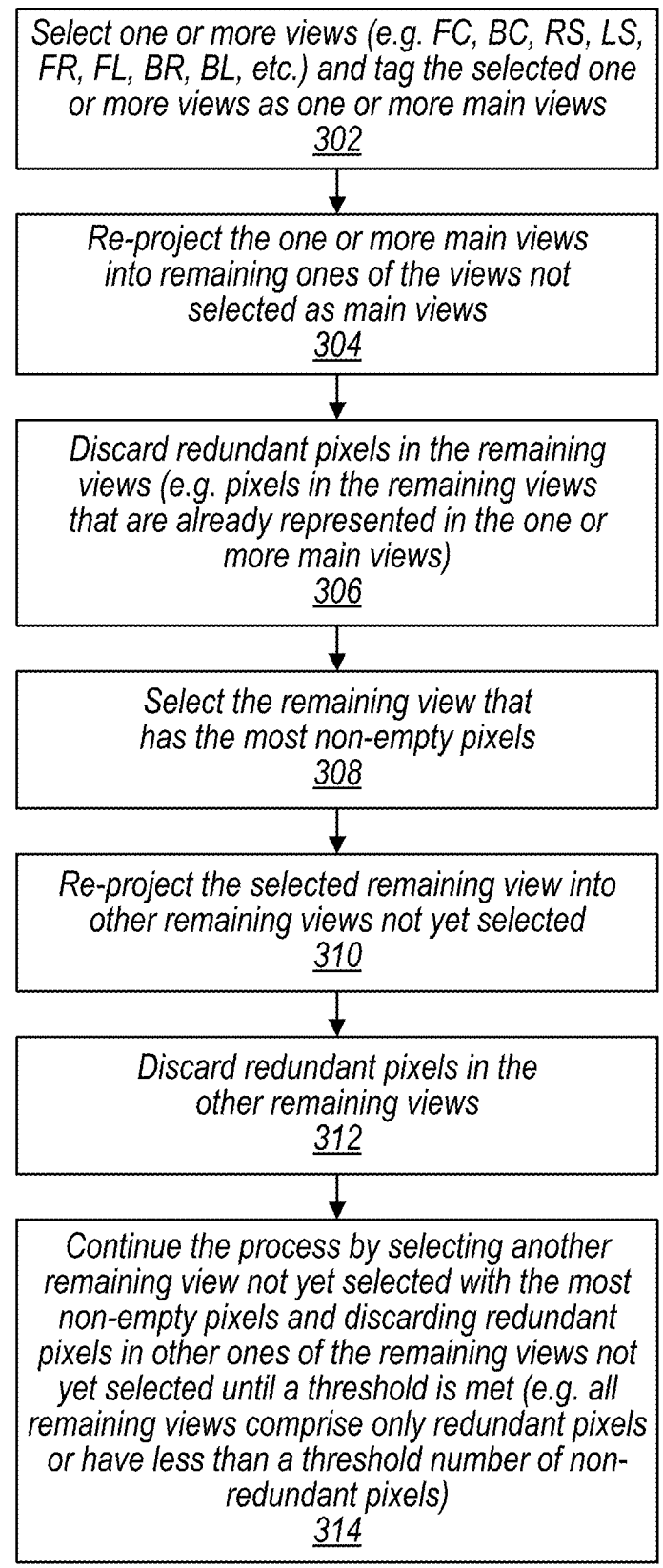
FIG. 3 illustrates a flowchart for an example process for generating an atlas from the captured views, wherein redundant information included in a given view is omitted from other views that are to be included in the atlas, according to some embodiments.

FIG. 3 illustrates a flowchart for an example process for generating an atlas from the captured views, wherein redundant information already included in a given view is omitted from other views that are to be included in the atlas, according to some embodiments.

At block 302, a view optimizer (such as view optimizer 506 of the encoder shown in FIG. 5) receives source views comprising both attribute and depth information, such as source views comprising views 120-134 illustrated in FIG. 1D. The view optimizer also selects one of the received views as a main view. In some embodiments, the view optimizer may also receive source camera parameters, such as source camera parameters 502, which indicate locations and orientations of the cameras that captured the source views.

The view optimizer may select one or more main views and tag the selected views as main views. In order to determine a ranking (e.g. ordered list of the views) at block 304 the view optimizer then re-projects the selected one or more main views into remaining ones of the views that were not selected as main views. For example, the front center view (FC) 120 and the back center view (BC) 122 may be selected as main views and may be re-projected into the remaining views, such as views 124-134. At block 306, the view optimizer determines redundant pixels, e.g. pixels in the remaining views that match pixels of the main views that have been re-projected into the remaining views. For example, portions of front right view 128 are redundant with portions of front center view 120, when pixels of front right view 128 are re-projected into front center view 120. In the example, these redundant pixels are already included in the main view (e.g. view 120 from the front center (FC)) and are omitted from the remaining view (e.g. view 128 from the front right (FR)).

The view optimizer (e.g. view optimizer 506) may iteratively repeat this process selecting a next remaining view as a "main view" for a subsequent iteration and repeat the process until no redundant pixels remain, or until a threshold number of iterations have been performed, or another threshold has been met, such as less than X redundant pixels, or less than Y total pixels, etc. For example, at block 310 the re-projection is performed using the selected remaining view (e.g. selected at 308) as a "main view" to be re-projected into other ones of the remaining views that were not selected as "main views" for this iteration or a previous iteration. Also, at block 312 redundant pixels identified based on the re-projection performed at 310 are discarded. At block 314 the process (e.g. blocks 308-312) are repeated until a threshold is met (e.g. all remaining views comprise only redundant pixels or have less than a threshold number of non-redundant pixels, etc.). The threshold may be measured also be based on all of the remaining views having empty pixels (e.g. they have already been discarded) or all of the remaining views have less than a threshold number of non-empty pixels.

The ordered list of views having non-redundant information may be provided from the view optimizer (e.g. view optimizer 506) to an atlas constructor of an encoder (e.g. atlas constructor 510 as shown in FIG. 5). Additionally, the source camera parameters 502 may be provided from the view optimizer 506 to the atlas constructor 510.

The atlas constructor 510 may prune the empty pixels from the respective views (e.g. the pixels for which redundant pixel values were discarded by the view optimizer 506). This may be referred to as "pruning" the views as shown being performed in atlas constructor 510. The atlas constructor 510 may further aggregate the pruned views into patches (such as attribute patch images and geometry patch images) and pack the patch images into respective image frames.

Figure 4:
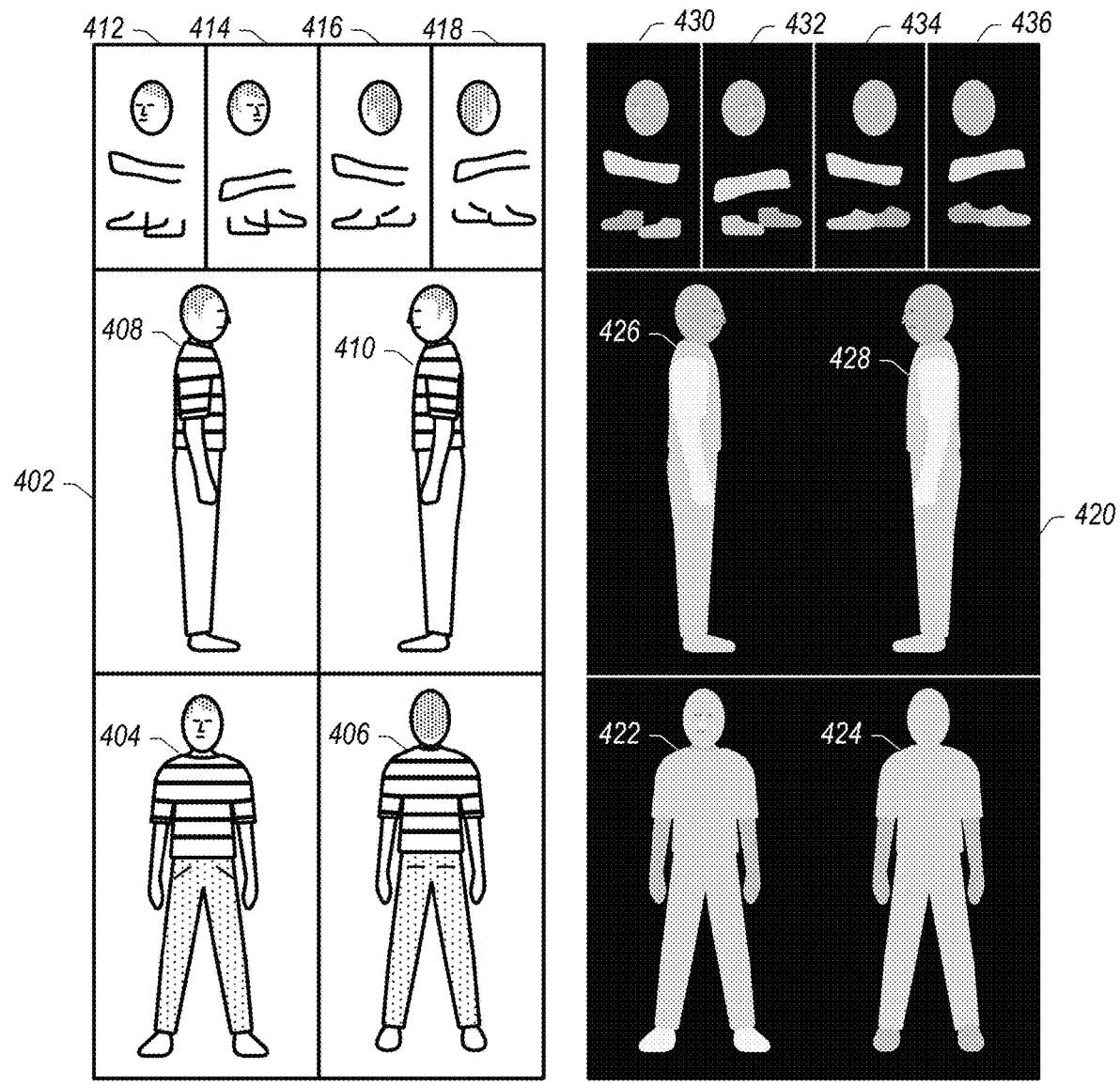
FIG. 4 illustrates an atlas comprising packed attribute patch images representing views included in the atlas, wherein redundant information has been omitted and also illustrates a corresponding atlas/depth map comprising depth patch images that correspond with the attribute patch images included in the adjacent attribute patch image atlas, according to some embodiments.

For example, FIG. 4 illustrates an atlas comprising packed attribute patch images representing views included in the atlas, wherein redundant information has been omitted and also illustrates a corresponding atlas/depth map comprising depth patch images that correspond with the attribute patch images included in the adjacent attribute patch image atlas, according to some embodiments.

Attribute patch images 404 and 406 for main views 120 and 122 are shown packed in the atlas 402. Also, patch images 408 and 410 comprising non-redundant pixels for views 124 and 126 are shown packed in atlas 402. Additionally, attribute patch images 412, 414, 416, and 418 comprising non-redundant pixels for remaining views 128, 130, 132, and 134 are shown packed in atlas 402.

Atlas 420/depth map 420 comprises corresponding depth patch images 422-436 that correspond to the attribute patch images 404-418 packed into attribute atlas 402.

FIG. 5 illustrates a block diagram for an encoder configured to encode three-dimensional volumetric visual content using video encoded attribute patch images, video encoded depth patch images, and video encoded transparency layers, according to some embodiments.

As discussed above, source camera parameters 502 indicating location and orientation information for the source cameras, such as cameras 104-118 as illustrated in FIGS. 1A-1C are provided to the view optimizer 506. Also source views 504 which, include both attributes (e.g. colors, textures, etc.) and depth information are provided to view optimizer 506. The view optimizer 506 determines main views and remaining views as discussed in regard to FIG. 3. The view optimizer 506 and/or the pruner of atlas constructor 510 may further disregard redundant pixels as described in FIG. 3. For example, the view optimizer may mark redundant pixels as empty and the pruner of atlas constructor 510 may prune the empty pixels. Note, the main views and remaining views along with camera lists comprising source camera parameter metadata comprising location and orientation information for the cameras that captured the main and remaining views are provided to atlas constructor 510. As shown in FIG. 5, the atlas constructor 510 prunes the views (main and remaining) to remove empty pixels. The atlas constructor 510 further aggregates the pruned views into patches and packs the patches into a 2D video image frame. For example, in atlas 402 redundant and/or empty pixels have been pruned from views 128, 130, 132, and 134. Also as shown in atlas 402 for views 128, 130, 132, and 134, the remaining (non-pruned) portions of these views have been aggregated into attribute patch images 412, 414, 416, and 418. These attribute patch images have further been packed into atlas 402, which may have a same size and/or resolution as the video image frame comprising the attribute patch images (e.g. atlas 402). It is worth pointing out that open space has been included in atlas 402 for ease of illustration. However, in at least some embodiments, the non-redundant portions of the views may be more closely packed into smaller patch images with less open space than what is shown in FIG. 4.

Figure 12:
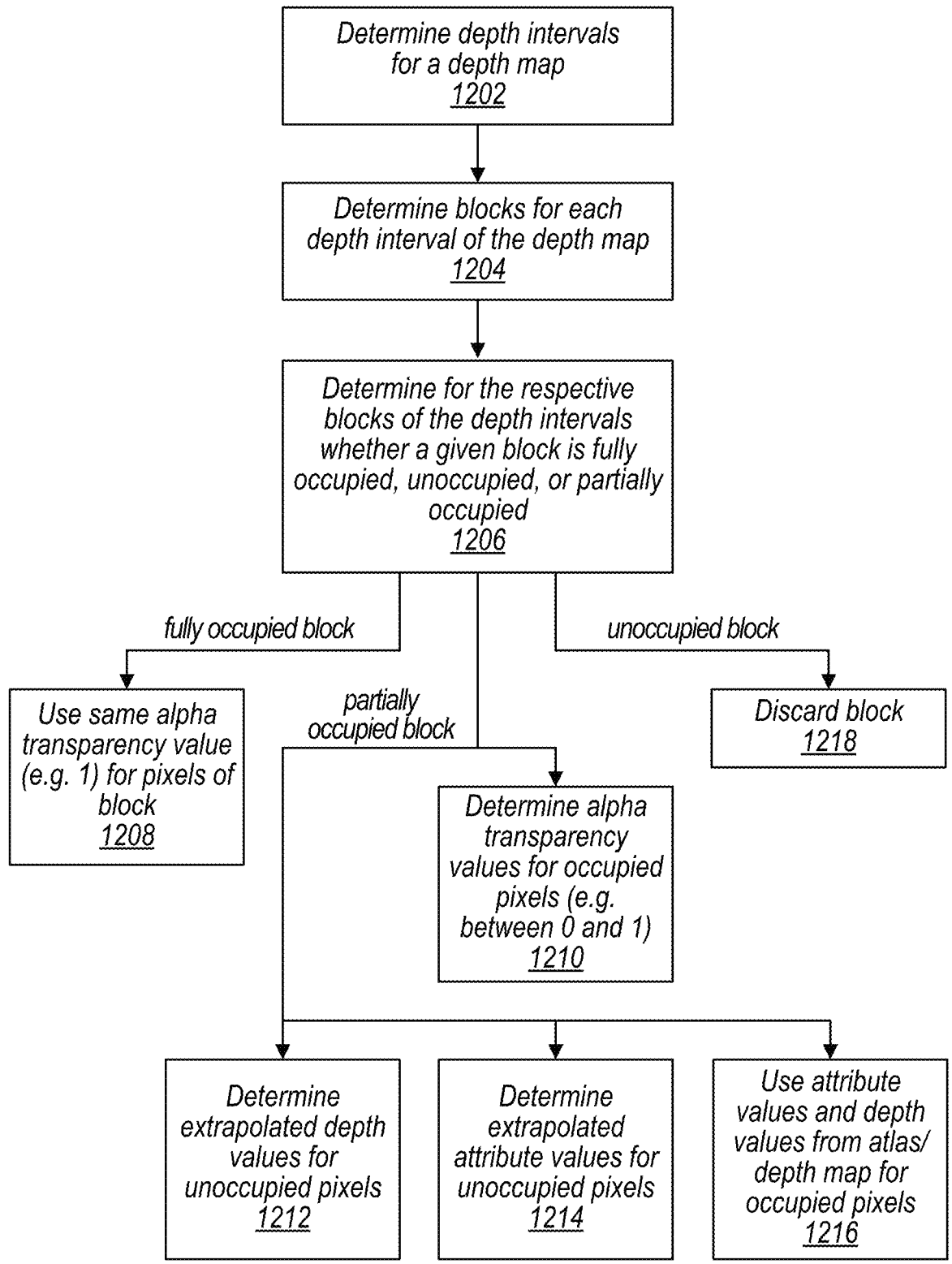
FIG. 12 is a flow chart illustrating an encoding process for encoding three-dimensional volumetric content using variable transparency layers, according to some embodiments.

Packed atlas 402 may be provided to transparency layer constructor 512 which determines depth intervals for use in evaluating the depth map and atlas generated by atlas constructor 510. Furthermore, transparency layer constructor 512 divides the depth map and atlas into blocks for one or more depth intervals and generates both depth blocks and attribute blocks for one or more depth intervals that correspond to blocks of the depth map and atlas provided by atlas constructor 510, wherein the blocks are partially or fully occupied with pixels having depth values falling into a respective one of the one or more depth intervals. For example, transparency layer constructor 512 may follow a similar process as shown in FIG. 12 for generating depth and attribute blocks for multiple depth intervals. Additionally, transparency layer constructor 512 generates variable transparency layers for the respective depth intervals. In some embodiments, the variable transparency layers may include alpha transparency channels that are to be used in an alpha transparency compositing at a decoder in order to reconstruct the 3D volumetric content.

Figure 9:
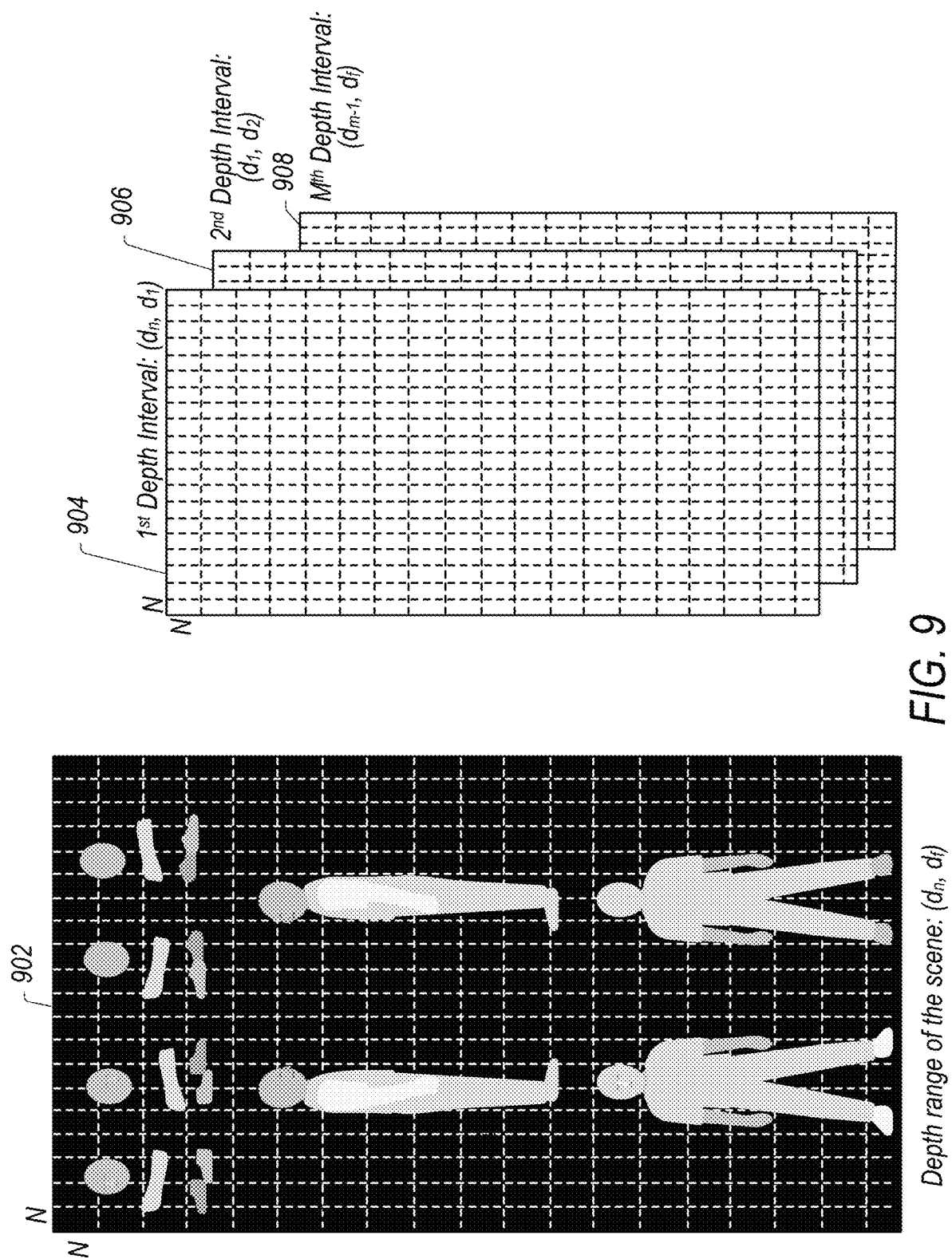
FIG. 9 illustrates an example depth map that is being divided into blocks for a plurality of depth intervals, according to some embodiments.

In some embodiments, a transparency layer constructor, such as transparency layer constructor 512, may divide a range of depth values for a scene into predetermined intervals. These intervals may be used to create layers from the input atlas. For each interval, the input atlas is divided into a grid of blocks of (N×N) pixels (as shown in FIG. 9). Each block can be identified by its depth interval ID and position in the grid, for example as shown in FIG. 9. During reconstruction, two triangles are generated for each N×N block. Since the number of blocks (and therefore size of the blocks) determines the number of triangles and vertices to be rendered at a rendering device, the decoder may adjust the size of the N×N blocks to adjust a level of complexity of reconstructing the scene using meshes (e.g. the mesh resolution of a mesh to be generated at the decoder may be adjusted by adjusting the size of the N×N blocks). In some embodiments, the encoder determines the size of the N×N blocks to be communicated to the decoder. The decoder can optionally create two triangles per N×N block, in which case the decoder effectively down-samples the depth map by only using depth values on four corners of the block. However, the decoder may optionally sub-divide the blocks into smaller blocks and then create two triangles for each of the smaller blocks, thus using more depth values of the depth map for the corners of the sub-divided blocks. For example, the depth values of the corners of the sub-divided blocks are used to determine depth values of the vertices of the two triangles generated per each given sub-divided block. In some embodiments, an encoder may signal metadata in the bit stream indicating relative portions of the 3D scene that are to be rendered using higher or lower mesh resolutions, in which case the decoder may determine which blocks to further sub-divide during a rendering process using the metadata included in the bit stream from the encoder.

In some embodiments, for each depth interval, the color and depth values are written into corresponding blocks for the pixels that have a depth value in the range of that interval. Blocks can be fully occupied, partially occupied, or empty. Then, variable transparency layer maps (e.g. alpha channel maps) are created for each block. For the fully occupied blocks, variable transparency values (e.g. alpha) is set to 1 for all pixels. Unoccupied blocks are discarded. For partially occupied blocks, variable transparency values (e.g. alpha) is set to 1 for occupied pixels and 0 for unoccupied pixels. The alpha transition from 1 to 0 can be a hard or smooth transition, depending on the depth transition for that area in the depth component of the input atlas. If the occupied pixels represent object boundaries, then the depth difference between foreground and background object is high. In that case, alpha will change from 1 to 0 sharply. For the continuous parts of the scene with a smooth depth transition, alpha will gradually change from 1 to 0 (e.g. alpha may have values of 0.1, 0.2, 0.3, 0.4, etc.).

In some embodiments, for partially occupied blocks, the depth and color components for empty areas are filled. This can be done by copying depth and color information from co-located pixels in the atlas, or the depth and color components may be extrapolated from existing pixels in the block. Extrapolating from the existing pixels may be done for a depth component to come up with a correct geometry on edges of an object or outside of the edges of an object, for example a same depth value can be repeated for empty parts of the block.

The depth interval blocks (e.g. depth blocks, attribute blocks, and variable transparency layer blocks for each depth interval) generated by the transparency layer constructor 512 are provided to the updated atlas constructor 514, which generates an updated atlas and updated depth map including the depth interval blocks for two or more depth intervals. In some embodiments, portions of the depth interval blocks may be consolidated into patches and the patches may be packed into an image frame. In some embodiments, different image frames may be used for attribute patches, depth patches, and variable transparency layer patches. In some embodiments, similar considerations may be taken into account when packing the updated atlas as were discussed above in regard to aggregation and packing of the original atlas.

The updated atlas, updated depth map, and corresponding variable transparency atlas (e.g. alpha transparency channel) are provided to video encoder 516 which may video encode the attribute patch images, video encode the depth patch images, and video encode the variable transparency layer patches.

In some embodiments, for each intra period (such as every 32 frames, as an example) the generated blocks for each depth interval are packed into a new atlas, a new depth map, and a new variable transparency layer map (which may also be organized as an atlas). The occupied blocks in each depth layer may be aggregated over all frames of the intra period. As noted above, multiple occupied blocks can exist in each position on the source atlas (e.g. original atlas) in different depth layers, therefore a larger atlas might be needed for the updated atlas. In some embodiments, the blocks are packed optimally in the updated atlas frames. For example, multiple neighboring blocks may be kept together or may be packed independently. Said another way, within a given intra period (e.g. 32 frames) the same patches and the same patch packing may be re-used for each frame, with the pixel values within the given patches (e.g. depth values and attribute values) changing between the respective frames. This allows for inter-frame coding to be used to improve compression efficiency of a video encoder that video encodes the new atlas, the new depth map, and the new variable transparency layer.

In some embodiments, segmentation and masks may be used to further simplify the process. For example, parts of the original atlas which can be reconstructed accurately with the targeted mesh density are identified (for example, an object or a subpart of an object). For each of those segments a mask is created. This mask is used as a variable transparency layer (e.g. alpha component). Boundaries of segments are preserved with the mask which functions as a variable transparency layer. Inside, such a segment fewer triangles can be used for reconstruction and rendering. However, the parts of the atlas that are not included in segments are encoded using the approach described above, wherein depth intervals are evaluated separately and alpha transparency layers are generated for the various depth layers.

Additionally, updated atlas constructor 514 and/or atlas constructor 510 generates an atlas parameters list 518, such as bounding box sizes and locations of the patch images in the packed updated atlas, updated depth map, and variable transparency atlas. The atlas constructor 510 and/or the updated atlas constructor 514 also generates a camera parameters list 508. For example, atlas constructor 510 may indicate in the atlas parameters list 518 that an attribute patch image (such as attribute patch image 404) has a bounding box size of M×N and has coordinates with a bottom corner located at the bottom left of the atlas. Additionally, an index value may be associated with the patch image, such as that it is a $1^{st}$, $2^{nd}$ etc. patch image in the index. Additionally, camera parameter list 508 may be organized by or include the index entries, such that camera parameter list includes an entry for index position 1 indicating that the camera associated with that entry is located at position X with orientation Y, such as camera 112 (the front center FC camera that captured view 120 that was packed into patch image 404). Note, that the above example given in terms of FIG. 4 is given for ease of illustration. However, the camera parameter list 508 and atlas parameter list 518 may be updated to correspond to the updated atlas, updated depth map, and variable transparency layer atlas generated by updated atlas constructor 514.

Metadata composer 520 may entropy encode the camera parameter list 508 and entropy encode the atlas parameter list 518 as entropy encoded metadata. The entropy encoded metadata may be included in a compressed bit stream long with video encoded packed image frames comprising attribute patch images that have been encoded via encoder 516 along with video encoded depth patch images and/or a depth map that have been video encoded via encoder 516 and video encoded variable transparency layer patch images/atlas that has been video encoded via encoder 516.

Decoding 3D Volumetric Content with Variable Transparency Layers

Figure 6:
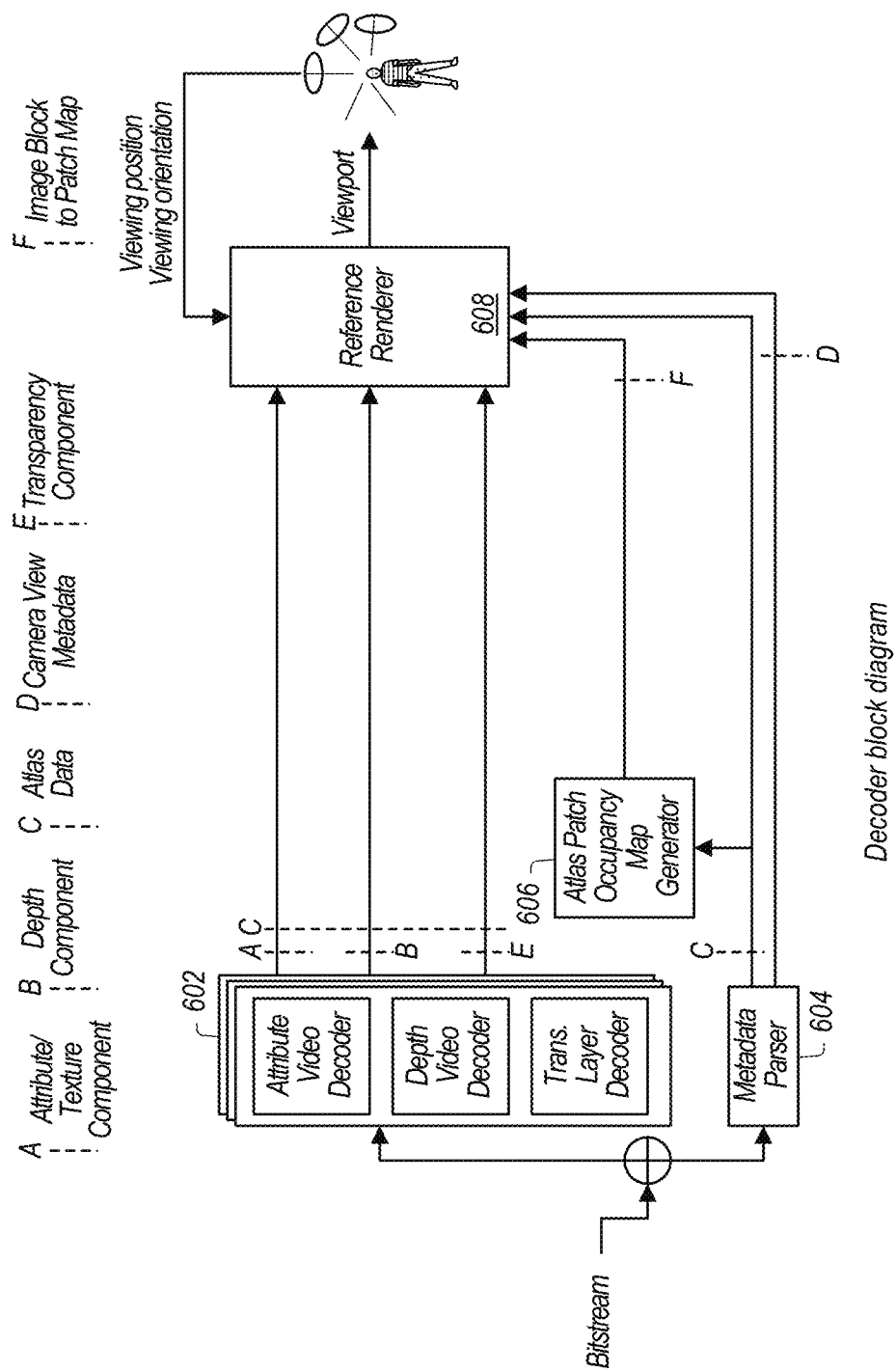
FIG. 6 illustrates a block diagram for a decoder configured to decode the encoded 3D volumetric content, wherein the decoder applies variable transparency layers, according to some embodiments.

FIG. 6 illustrates a block diagram for a decoder configured to use video encoded attribute patch images, a video encoded depth map, and video encoded variable transparency layers to generate a reconstructed version of encoded 3D volumetric content, according to some embodiments.

The compressed bit stream may be provided to a decoder, such as the decoder shown in FIG. 6. The entropy encoded metadata may be directed to a metadata parser 604 and the video encoded image frames comprising attribute patch images packed in the image frames, the depth patch images packed in the same image frame or an additional image frame, and the variable transparency layer images packed into one of the same image frames or a different image frame may be provided to decoder 602, which may video decode the attribute image frames, the depth image frames (e.g. depth maps), and the variable transparency layer image frames. The decoded atlas (or set of complimentary decoded atlases) comprising attribute patch images, depth patch images, and variable transparency layer patch images may be provided to reference renderer 608 along with atlas patch occupancy maps that have been generated by atlas patch occupancy map generator 606 using the entropy decoded atlas parameter list. Also, the camera view metadata included in the entropy decoded metadata may be provided to reference renderer 608. For example, camera parameter list metadata may be used by reference renderer 608 to select a given view of the 3D volumetric content to render based on a user manipulation of the viewport (e.g. viewing position and viewing orientation information received by the reference renderer 608).

Figure 7:
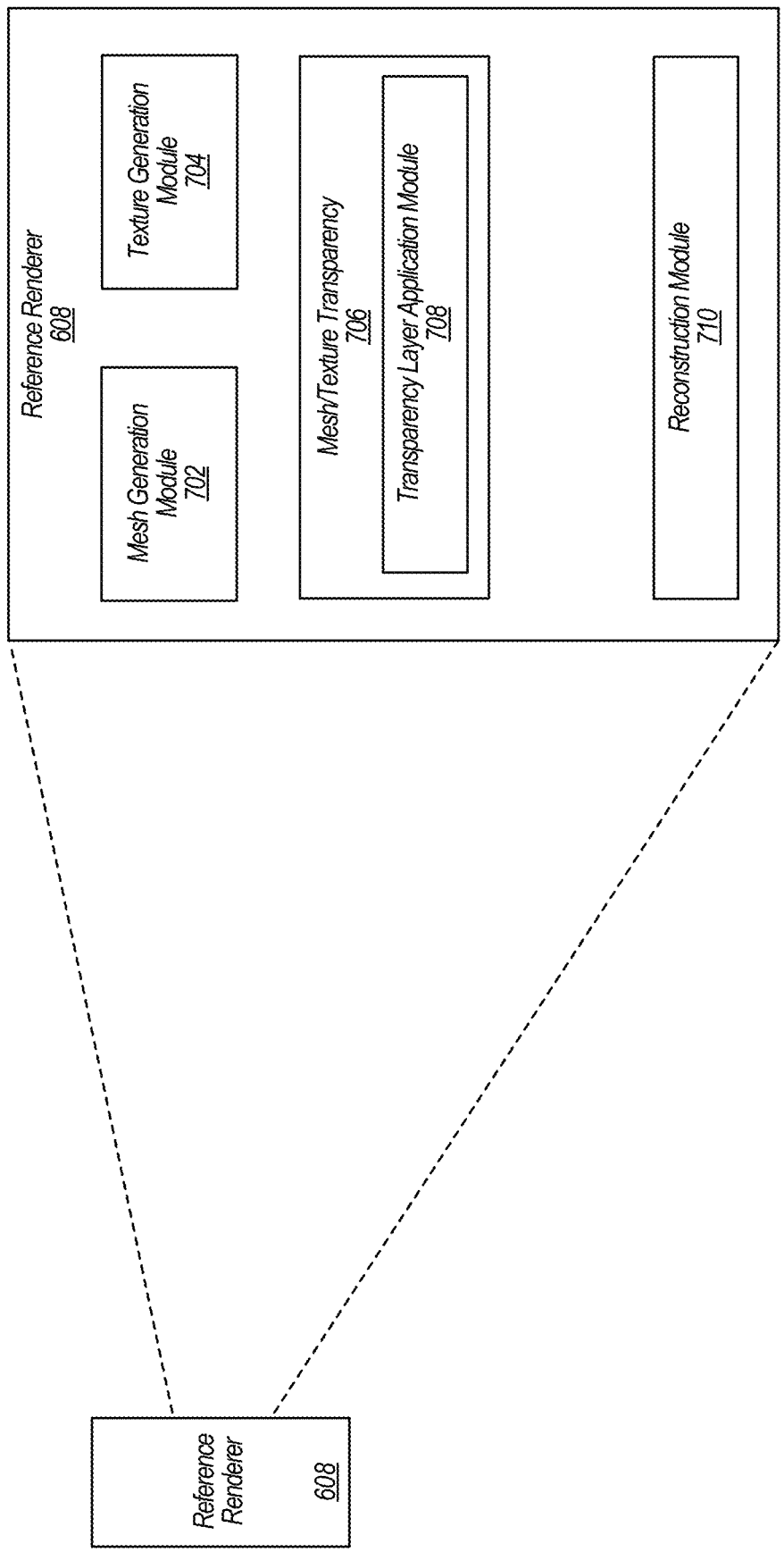
FIG. 7 illustrates a block diagram showing additional processes performed by a reference renderer to render three-dimensional (3D) volumetric content using variable transparency layers, according to some embodiments.

FIG. 7 illustrates a block diagram showing additional processes performed by a reference renderer to render three-dimensional (3D) volumetric content using variable transparency layers, according to some embodiments.

In some embodiments, a reference renderer, such as reference render 608, may include a mesh generation module 702, a texture generation module 704, a mesh/texture transparency module 706, and a reconstruction module 710.

The mesh/texture transparency module 706 may include a transparency layer application module 708 that applies the reconstructed variable transparency layer to a mesh and texture portion generated by mesh generation module 702 and texture generation module 704. The combined meshes and textures to which the variable transparency layer has been applied may be merged to form a reconstructed view of the 3D scene, for example by reconstruction module 710.

Figure 8A:
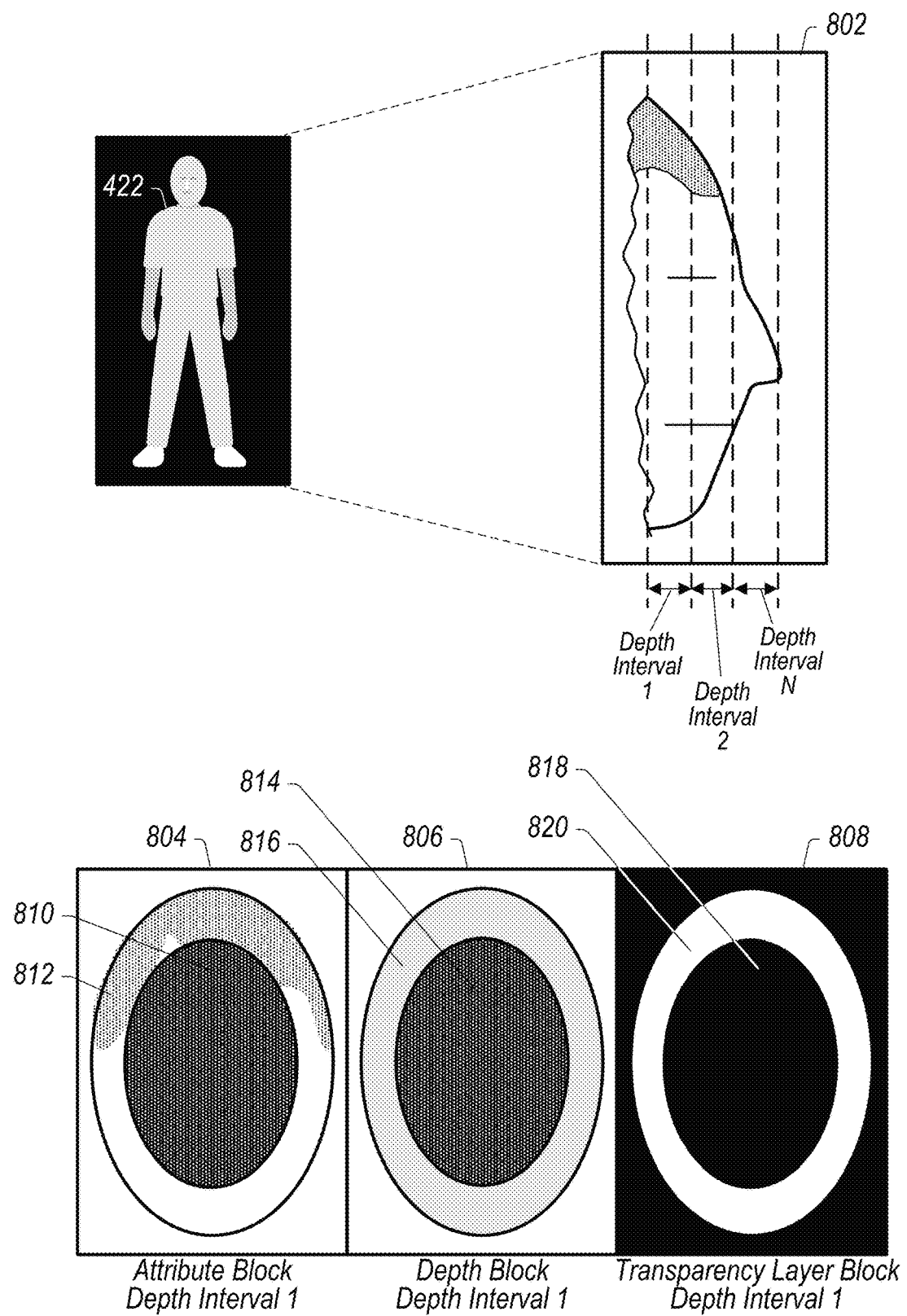
FIGS. 8A-8B illustrate example attribute blocks, depth blocks and variable transparency blocks for a plurality of depth intervals, according to some embodiments.
Figure 8B:
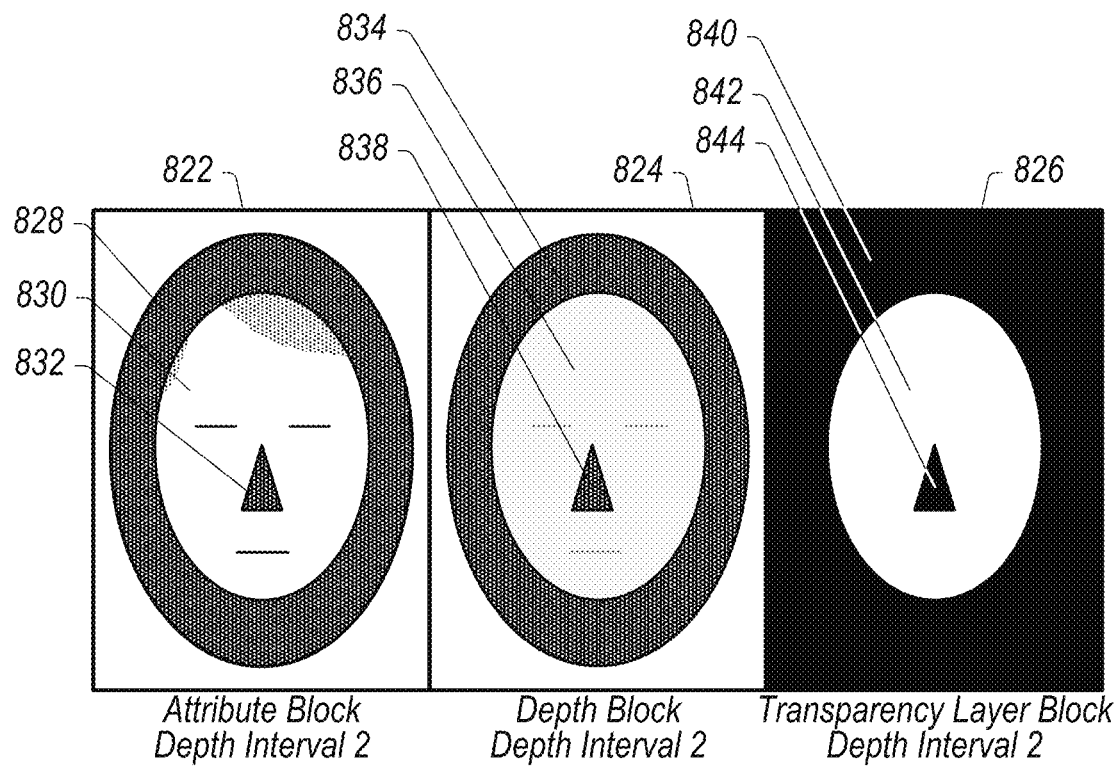

FIGS. 8A-8B illustrate example attribute blocks, depth blocks and variable transparency blocks for a plurality of depth intervals, according to some embodiments.

Figure 8B:
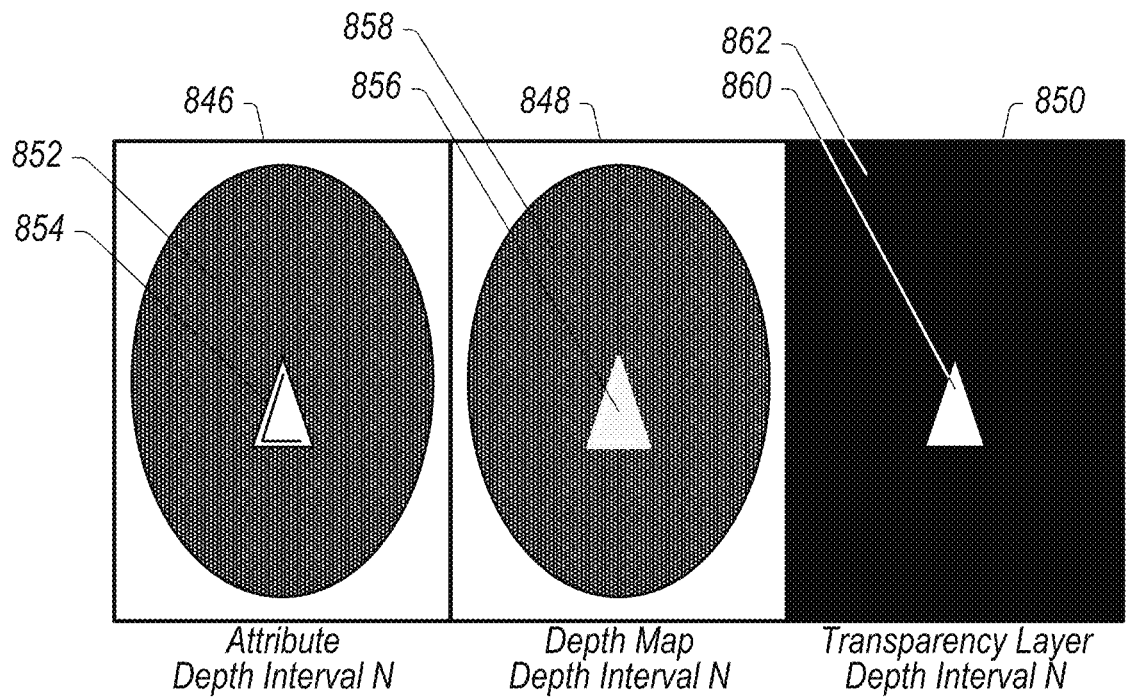

For example, side view 802 of person 102's head shows a plurality of depth intervals, such as depth interval 1, depth interval 2, and depth interval N. In some embodiments, a transparency layer constructor, such as transparency layer constructor 512, may determine the depth intervals to be applied or more apply pre-determined depth intervals to a scene. For example, the depth intervals may be applied to a depth map to determine pixels of the depth map indicating depth values falling within respective ones of the depth intervals. For ease of illustration, FIG. 8 shows depth intervals being applied to the head portion of person 102 shown in depth map 422. However, in some embodiments, depth intervals may be applied at a block level wherein the blocks have a different size than what is illustrated in FIG. 8A.

Continuing the example, portions of the person 102's head around the periphery of the face fall within the first depth interval. For example, the lower portion of FIG. 8A shows an attribute block, depth block, and transparency block for the depth interval 1. Note that in some embodiments, multiple different sets of attribute, depth, and transparency blocks may be generated for different original atlas/original depth map blocks that are fully or partially occupied with pixels having depth values in the $1^{st}$ depth interval. However, for ease of illustration, a single block is shown in FIG. 8A. As can be seen, in attribute block 804, an occupied portion 812 is included in the attribute block because corresponding depth values 816 fall within the depth value intervals for depth interval 1. Unoccupied portion 810 is not included in depth interval 1 and solid portion 818 of transparency layer block 808 indicates that these portions of the attribute block 804 and depth block 806 are outside of the boundaries of depth interval 1, while occupied portions 812 and 816 are indicated as being included in the boundaries of depth interval 1. For example portion 820 of transparency layer block 808 corresponds with portions that are to be included in depth interval 1 and indicates the boundaries of depth interval 1. In some embodiments, portions 810 and 814 may be filled with pixel values that are extrapolated from neighboring pixels in depth interval 1. For example, this may reduce encoding costs for encoding the attribute block 804 and the depth block 806.

Further continuing the example, FIG. 8B illustrates attribute blocks, depth blocks and transparency layer blocks for depth intervals 2 and N. For example, attribute block 822 for depth interval 2 includes occupied portion 830 that corresponds to depth values 836 of depth block 824, wherein the depth values 836 fall within the depth value range for depth interval 2. Also, unoccupied portions 828 and 832 of attribute patch 822 correspond to depth values 834 and 838 which fall outside of depth values included in a depth range for depth interval 2. Additionally, transparency layer block 826 indicates that portions 840 and 844 are to be excluded from depth interval 2, wherein portions 840 and 844 correspond to unoccupied portions 828 and 832 in attribute block 822 and unoccupied portions 834 and 838 in depth block 824. Also, transparency layer block 826 indicates that portion 842 is to be included in depth interval 2, wherein portion 842 corresponds to occupied portion 830 of attribute block 822 and occupied portion 836 of depth block 824. Note that portion 842 of transparency layer block 826 indicates boundaries for portions of the person's face that are to be included in depth interval 2, such as the front of the face minus the periphery that was included in depth interval 1 and minus portions of the nose included in depth interval N.

Further continuing the example, FIG. 8B illustrates attribute bock 846, depth block 848 and transparency layer block 850 for depth interval N (e.g. a $3^{rd}$ depth interval). Unoccupied portion 852 of attribute block 846 corresponding to depth values 858 are excluded from depth interval N and occupied portion 854 of attribute block corresponding to depth values 856 of depth block 848 are included in depth interval N. Additionally, transparency layer block 850 indicates portion 860 that corresponds to occupied portions 854 and 856 of attribute block 846 and depth block 848 that are included in depth interval N, wherein portion 862 indicates portions that are transparent in depth interval N.

FIG. 9 illustrates an example depth map that is being divided into blocks for a plurality of depth intervals, according to some embodiments.

As another example, an original depth map, such as depth map 420, may be divided into N×N blocks as shown in 902. Additionally, depth interval specific depth maps 904, 906, and 908 may be created. Blocks in the depth interval specific depth maps 904, 906, and 908 that do not include any pixels having depth values falling within the respective depth interval (e.g. empty blocks) may be discarded. For fully occupied or partially occupied blocks, corresponding attribute blocks and variable transparency blocks are created. The remaining depth blocks and created attribute and variable transparency layer blocks are then packed into an updated atlas, an updated depth map, and a variable transparency layer map. The updated atlas with corresponding updated depth map and variable transparency layer map are video encoded. Also, atlas parameters for the updated atlas, updated depth map, and variable transparency layer map are generated and included in the bit stream, e.g. entropy encoded.

Figure 10:
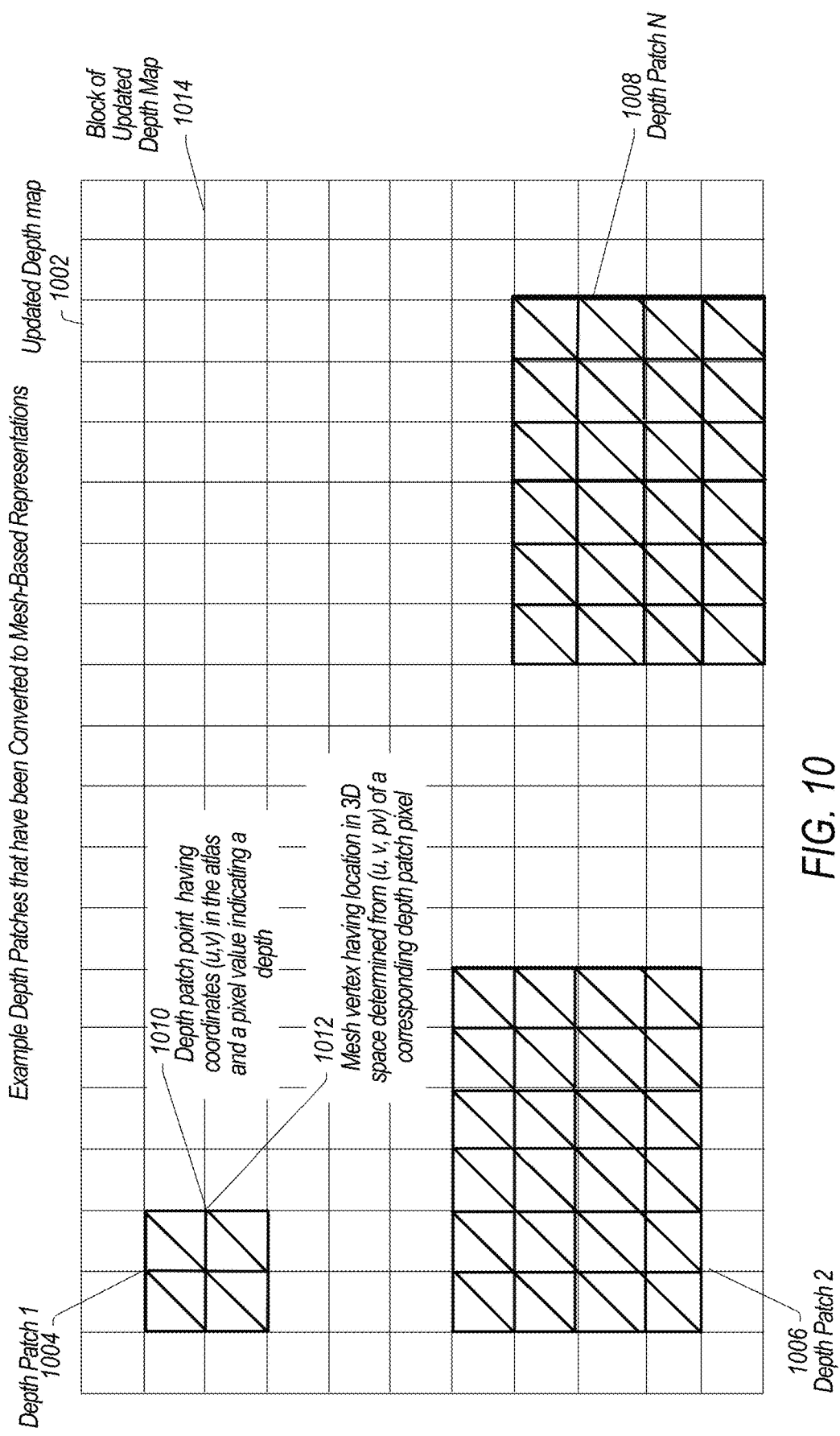
FIG. 10 illustrates example sub-meshes generated by a decoder based on depth values of a depth map, according to some embodiments.

FIG. 10 illustrates example sub-meshes generated by a decoder based on depth values of a depth map, according to some embodiments.

A decoder may generate sub-meshes based on depth values included in depth patches of the updated depth map. For example, FIG. 10 illustrates updated depth map 1002 having blocks 1014. A first depth patch 1004 is used to generate a sub-mesh by creating two triangles per set of four corners of a block, wherein pixels of the depth map corresponding to the four corners of the block indicate depth values that are used to generate a triangle vertex having the indicated depth. A similar process is performed to generate sub-meshes for depth patch 2 (1006) and depth path N (1008). As discussed above, in some embodiments, the encoder determines the size of the blocks to be communicated to the decoder. The decoder can optionally create two triangles per block, in which case the decoder effectively down-samples the depth map by only using depth values on four corners of the block. However, the decoder may optionally sub-divide the blocks into smaller blocks and then create two triangles for each of the smaller blocks, thus using more depth values of the depth map for the corners of the sub-divided blocks.

Figure 11:
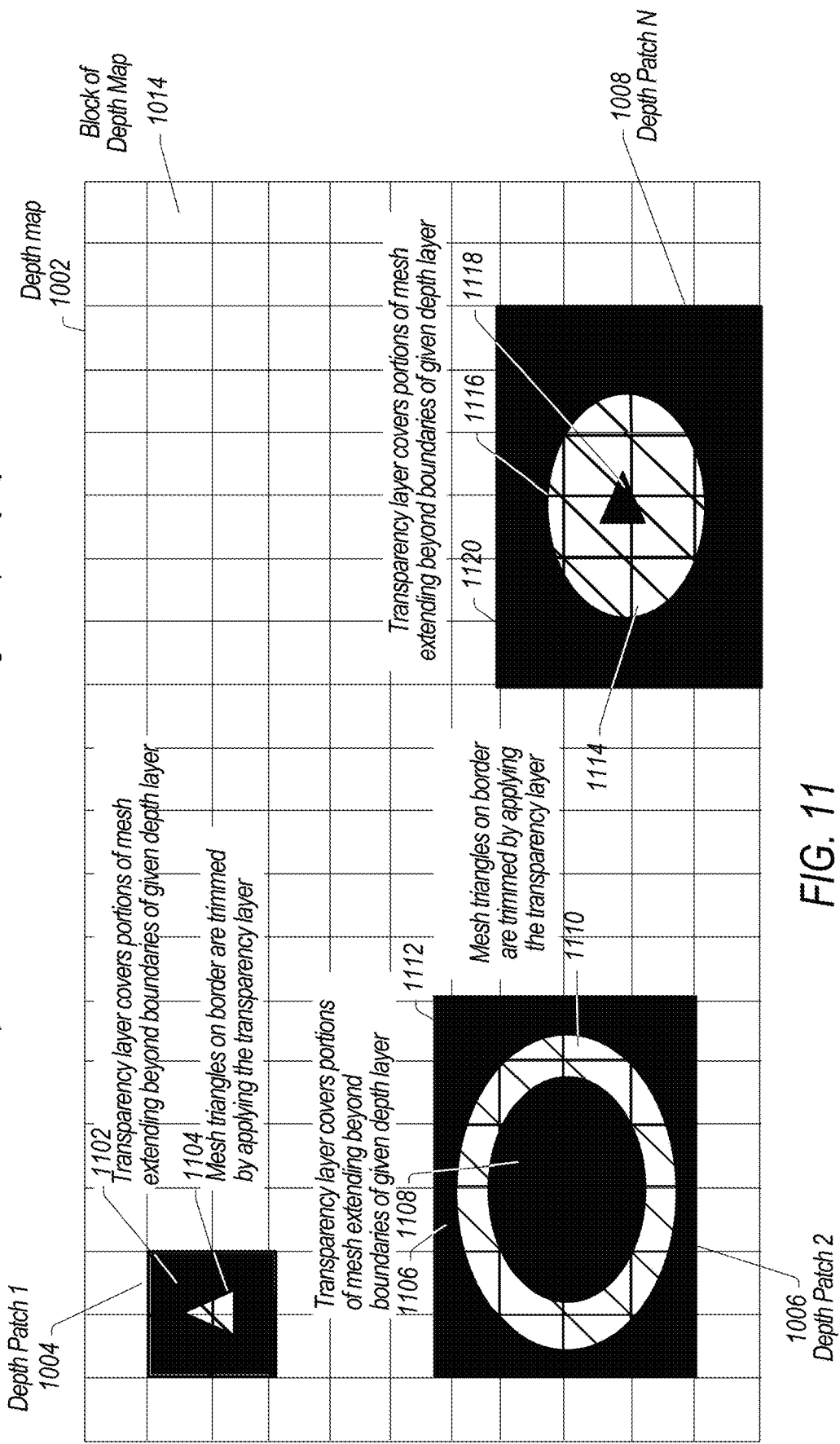
FIG. 11 illustrates example variable transparency layers being applied to the generated sub-meshes to make portions of the polygons or triangles extending beyond boundaries of the object and/or depth interval transparent, according to some embodiments.

FIG. 11 illustrates example variable transparency layers being applied to the generated sub-meshes to make portions of the polygons or triangles extending beyond boundaries of the object and/or depth interval transparent, according to some embodiments.

Transparency layer 1102 is applied to the sub-mesh generated for depth patch 1 (1004). For example, transparency layer 1102 may be indicated in transparency block 850 described in FIG. 8B. Portions of the triangles of the sub-mesh for depth patch 1 (1004) falling on the black portions of the transparency layer 1102 are made transparent, such that only the portions of the triangles falling in the white area of transparency layer 1102 are visible.

In a similar manner transparency layer 1112 is applied to a sub-mesh generated for depth patch 2 causing triangles having portions falling in portions 1106 and 1108 of the transparency layer 1112 to be made transparent and preserving portions of the triangles falling in portion 1110 of the transparency layer 1112. Also, transparency layer 1120 is applied to a sub-mesh generated for depth patch N (1008), wherein portions of triangles falling in portions 1116 and 1118 of variable transparency layer 1120 are made transparent and portions of triangles falling in portion 1114 of variable transparency layer 1120 are preserved.

In some embodiments, variable transparency layers may also be applied to attributes, such as texture images to be projected on the non-transparent portions of the sub-meshes. In some embodiments, the transparency layers may be applied as part of reconstructing the patch instead of being applied to both the mesh triangles and the attributes separately. Thus, while FIG. 11 shows the transparency layers being applied to the mesh triangles, in some embodiments, the transparency layer may be applied when the mesh triangles are combined with the attribute values (e.g. textures) to reconstruct the patches.

FIG. 12 is a flow chart illustrating an encoding process for encoding three-dimensional volumetric content using variable transparency layers, according to some embodiments.

At element 1202, an encoder determines depth intervals to be applied to a depth map to generate depth interval blocks and at element 1204, the encoder determines blocks for each depth interval of the depth map. In some embodiments, the encoder may also select block sizes for the blocks.

At element 1206, the encoder determines whether each of the respective depth interval blocks is fully occupied, partially occupied, or unoccupied. For example all pixels in a fully occupied block correspond to depth values falling within a range for the depth interval. Partially occupied blocks include some pixels falling within the range for the depth interval but also include other pixels that correspond to depth values that are not within the range of the depth interval. Unoccupied blocks do not include any pixels corresponding to depth values falling within the range for the depth interval.

At element 1218, the unoccupied blocks are discarded such that they are not further evaluated and are not included in the updated atlas/updated depth map. At element 1208, the fully occupied blocks are assigned a same transparency value, such as 1 and the corresponding attribute block and depth map block from the original atlas and original depth map may be used as the attribute block and the depth block for the fully occupied blocks in the updated atlas and updated depth map. Also a variable transparency layer block having the assigned alpha transparency value (e.g. 1) for each pixel is generated for the fully occupied block.

For the partially occupied blocks, at element 1212 extrapolated depth values are determined for unoccupied pixels, at element 1214 extrapolated attribute values are determined for the unoccupied pixels, and at element 1216 attribute values and depth values of the occupied portions of the partially occupied blocks of the original atlas/original depth map are used for the attribute block and depth block of a given depth interval. Also at element 1210 alpha transparency values are determined for a variable transparency layer block corresponding to the partially occupied block, wherein values of 0, 1, or a value between 0 and 1 are assigned based on whether a given pixel of the partially occupied block is occupied or unoccupied. If the occupied pixels represent object boundaries, then the depth difference between foreground and background object is high. In that case, alpha will change from 1 to 0 sharply. For the continuous parts of the scene with a smooth depth transition, alpha will be gradually changed from 1 to 0.

Figure 13:
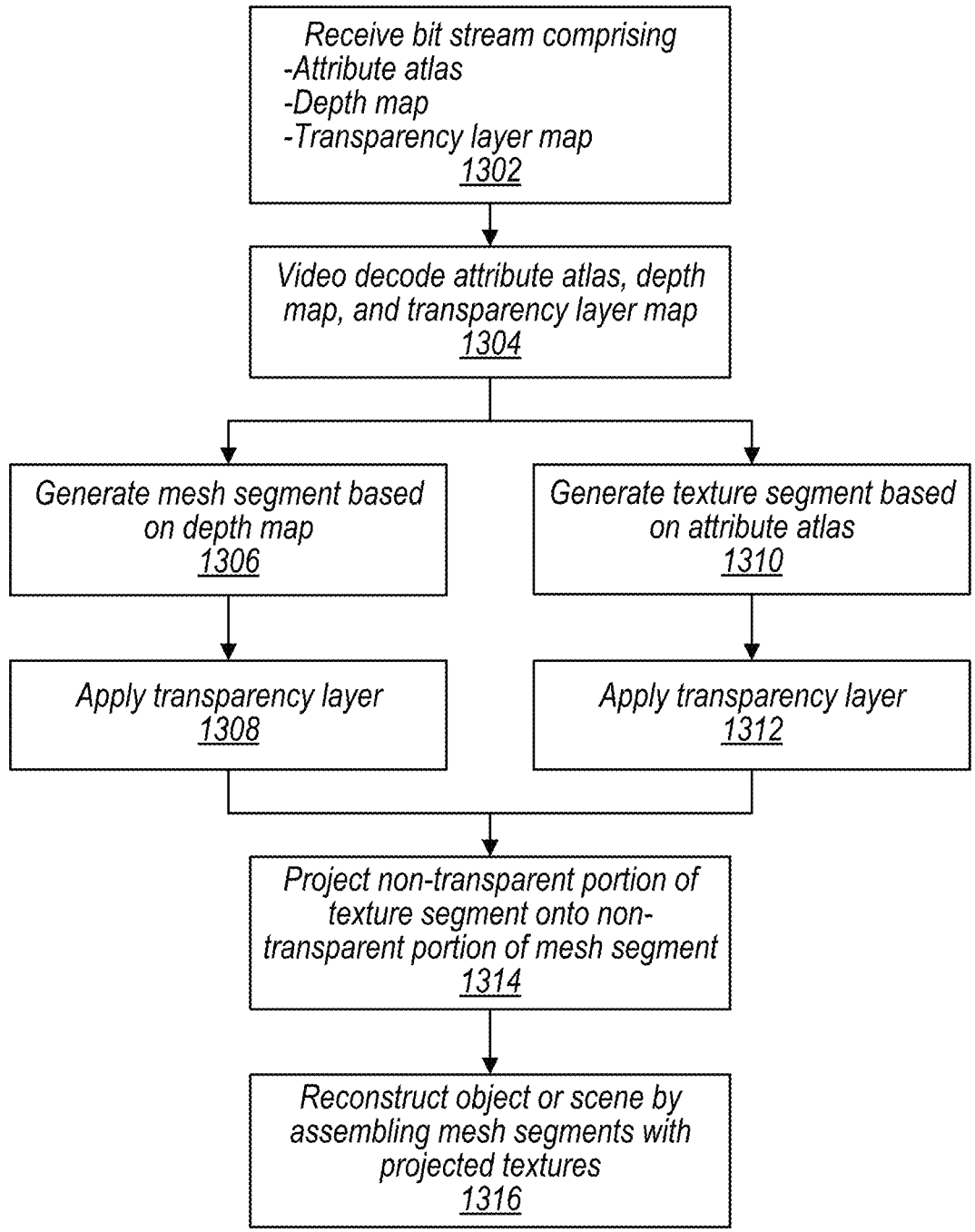
FIG. 13 is a flow chart illustrating a decoding process for decoding a bit stream comprising compressed three-dimensional volumetric content, wherein variable transparency layers are applied in decoding/rendering the three-dimensional volumetric content, according to some embodiments.

FIG. 13 is a flow chart illustrating a decoding process for decoding a bit stream comprising compressed three-dimensional volumetric content, wherein variable transparency layers are applied in decoding/rendering the three-dimensional volumetric content, according to some embodiments.

At element 1302, a decoder receives a bit stream comprising a video encoded attribute atlas (e.g. updated atlas generated by an encoder), a depth map (e.g. updated depth map generated by an encoder), and a variable transparency layer map. At element 1304, the decoder video decodes the attribute atlas, the depth map, and the variable transparency layer map included in the bit stream. At element 1306, the decoder generates a sub-mesh for a depth patch of the decoded depth map. Also, at element 1310, the decoder generates a texture segment corresponding to the sub-mesh based on an attribute patch of the video decoded attribute atlas. At element 1308 and 1312, the decoder applies the variable transparency layer corresponding to the depth path and attribute patch used at 1306 and 1310 to the respective sub-mesh and attribute segment, wherein portions of the mesh or attribute segment falling outside of the boundaries indicated in the variable transparency layer are made transparent. At element 1314 the remaining non-transparent portions of the texture segment are projected onto the remaining non-transparent portions of the sub-mesh. This process may be repeated for each set of depth patch images and corresponding attribute patch images in the attribute atlas and depth map.

At element 1316, the decoder reconstructs the 3D scene or object by assembling the remaining non-transparent portions of the sub-meshes that have had the non-transparent portions of their corresponding textures projected onto them. In some embodiments, the decoder may additionally apply a blending technique for example for overlapping portions of meshes that extend beyond boundaries of respective objects in the 3D scene.

Example Computer System

Figure 14:
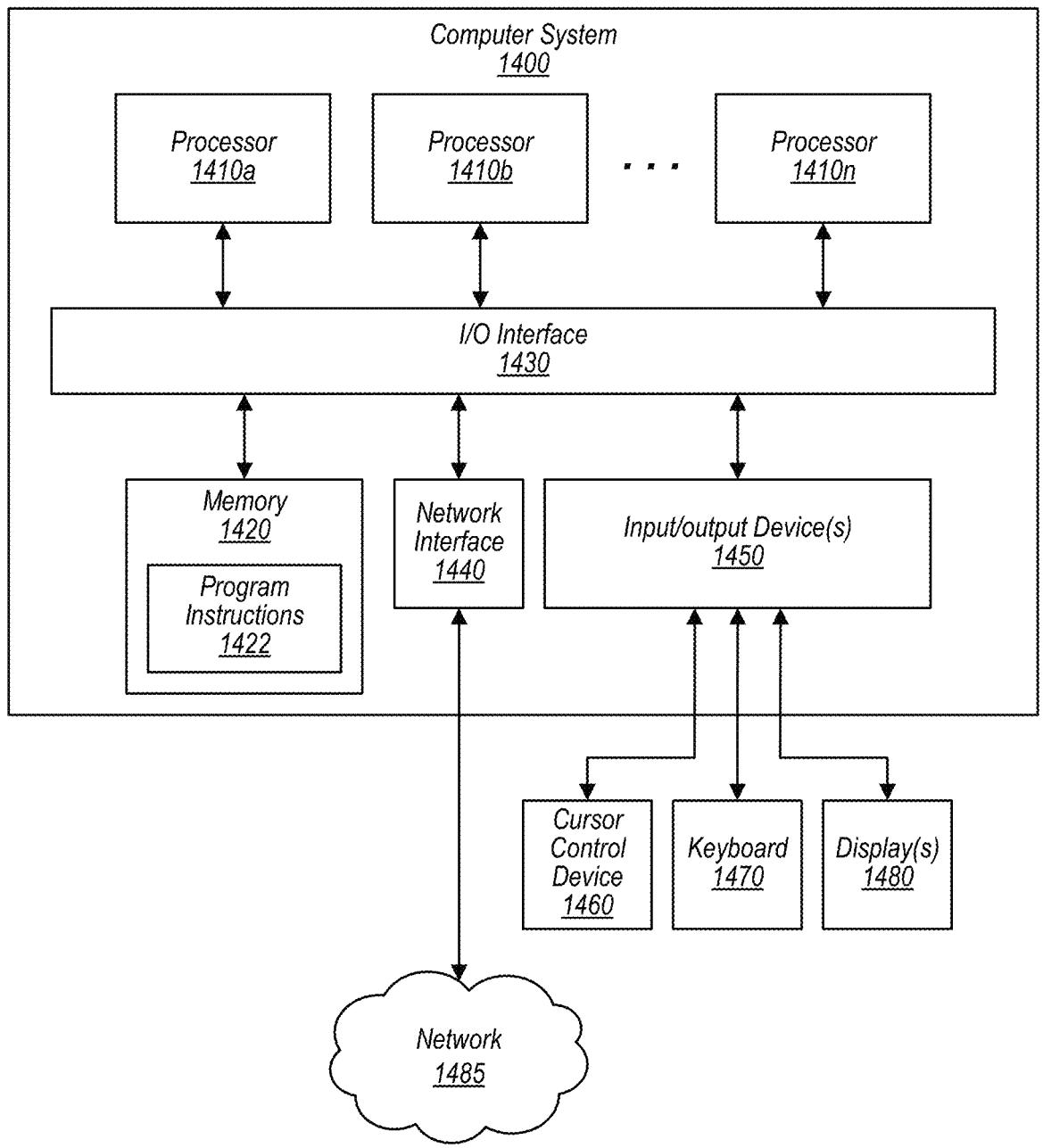
FIG. 14 illustrates an example computer system that may implement an encoder or decoder, according to some embodiments.

FIG. 14 illustrates an exemplary computer system 1400 usable to implement an encoder or decoder as described above with reference to FIGS. 1-13. In different embodiments, computer system 1400 may be any of various types of devices, including, but not limited to, a personal computer system, desktop computer, laptop, notebook, tablet, slate, pad, or netbook computer, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

In the illustrated embodiment, computer system 1400 includes one or more processors 1410 coupled to a system memory 1420 via an input/output (I/O) interface 1430.

Computer system 1400 further includes a network interface 1440 coupled to I/O interface 1430, and one or more input/output devices 1450, such as cursor control device 1460, keyboard 1470, and display(s) 1480.

System memory 1420 may be configured to store compression or decompression program instructions 1422 and/or sensor data accessible by processor 1410. In various embodiments, system memory 1420 may be implemented using any suitable memory technology, such as static random access memory (SRAM), synchronous dynamic RAM (SDRAM), nonvolatile/Flash-type memory, or any other type of memory. In the illustrated embodiment, program instructions 1422 may be configured to implement an encoder or decoder incorporating any of the functionality described above. In some embodiments, program instructions and/or data may be received, sent or stored upon different types of computer-accessible media or on similar media separate from system memory 1420 or computer system 1400. While computer system 1400 is described as implementing the functionality of functional blocks of previous Figures, any of the functionality described herein may be implemented via such a computer system.

In one embodiment, I/O interface 1430 may be configured to coordinate I/O traffic between processor 1410, system memory 1420, and any peripheral devices in the device, including network interface 1440 or other peripheral interfaces, such as input/output devices 1450. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computer system 1400 and other devices attached to a network 1485 (e.g., carrier or agent devices) or between nodes of computer system 1400. Network 1485 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1450 may, in some embodiments, include one or more display terminals, keyboards, keypads, touchpads, scanning devices, voice or optical recognition devices, or any other devices suitable for entering or accessing data by one or more computer systems 1400. Multiple input/output devices 1450 may be present in computer system 1400 or may be distributed on various nodes of computer system 1400. In some embodiments, similar input/output devices may be separate from computer system 1400 and may interact with one or more nodes of computer system 1400 through a wired or wireless connection, such as over network interface 1440.

As shown in FIG. 14, memory 1420 may include program instructions 1422, which may be processor-executable to implement any element or action described above. In one embodiment, the program instructions may implement the methods described above. In other embodiments, different elements and data may be included.

Computer system 1400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1400 may be transmitted to computer system 1400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A non-transitory, computer-readable, medium storing program instructions, that when executed using one or more processors, cause the one or more processors to:
receive images of a three-dimensional (3D) scene, wherein the images are captured from a plurality of camera viewing angles; and
generate based on the received images:
an atlas comprising attribute values for views of the 3D scene;
a depth map comprising depth values for views of the 3D scene; and
a variable transparency layer comprising transparency values that indicate one or more boundaries of one or more objects in the 3D scene, wherein to generate the variable transparency layer, the program instructions, when executed using the one or more processors, cause the one or more processors to:
determine two or more depth intervals for the depth values of the depth map, wherein:
pixels of the depth map having depth values falling within a given one of the two or more depth intervals are included in the given depth interval; and
other ones of the pixels of the depth map having depth values falling within another one of the two or more depth intervals are included in the other depth interval; and
determine the transparency values for the transparency layer based on evaluating depth differences between pixels values included in a same one of the respective two or more depth intervals; and
encode the attribute values of the atlas, the depth values of the depth map, and the transparency values of the transparency layer.

2. The non-transitory, computer-readable, medium of claim 1, wherein the transparency values are signaled as alpha channel values to be used in an alpha compositing by a decoder to determine the one or more boundaries of the one or more objects in the 3D scene.

3. The non-transitory, computer-readable, medium of claim 1, wherein the program instructions, when executed using the one or more processors, further cause the one or more processors to:
divide the atlas and the depth map into blocks; and
for respective ones of the blocks of the depth map comprising depth values falling within different ones of the two or more depth intervals:
generate a first depth block comprising pixels of the respective block falling within a first one of the depth intervals and generate a corresponding attribute block for the first depth block, the corresponding attribute block comprising corresponding attribute pixels that correspond to pixels included in the first depth block;
generate one or more additional depth blocks comprising pixels of the respective block falling within one or more additional ones of the two or more depth intervals and generate one or more additional corresponding attribute blocks for the one or more additional depth block, the one or more additional corresponding attribute blocks comprising corresponding attribute pixels that correspond to pixels included in the one or more additional depth blocks; and
generate a corresponding variable transparency layer for each set of depth interval blocks of a plurality of sets of depth interval blocks, wherein each set of depth interval blocks comprises depth blocks or additional depth blocks for blocks of the depth map falling within a given depth interval and corresponding attribute block or additional attribute blocks for the depth blocks of the depth map falling within the given depth interval.

4. The non-transitory, computer-readable, medium of claim 3, wherein prior to generating the variable transparency layer, the program instructions, when executed using the one or more processors, further cause the one or more processors to:
discard one or more ones of the blocks of the atlas and depth map that are not occupied with pixels indicating a depth value or an attribute value.

5. The non-transitory, computer-readable, medium of claim 3, wherein to generate the corresponding variable transparency layers for each set of the plurality of sets of depth interval blocks, the program instructions, when executed using the one or more processors, further cause the one or more processors to:
use a same transparency value for pixels of a variable transparency layer for blocks of a given depth interval that are fully occupied, wherein a fully occupied block comprises pixels indicating depth values or attribute values for an object in the 3D scene having depth values falling within the given depth interval and does not include unoccupied pixels in the given depth interval.

6. The non-transitory, computer-readable, medium of claim 5, wherein to generate the corresponding variable transparency layers for each set of the plurality of sets of depth interval blocks, the program instructions, when executed using the one or more processors, further cause the one or more processors to:
use varying transparency values for blocks that are partially occupied with pixels indicating depth values or attribute values for an object in the 3D scene having depth values falling within the given depth interval, wherein the partially occupied blocks also include other unoccupied pixels.

7. The non-transitory, computer-readable, medium of claim 6, wherein to generate the corresponding variable transparency layers for each set of the plurality of sets of depth interval blocks, the program instructions, when executed using the one or more processors, further cause the one or more processors to:
determine attribute values and depth values for the unoccupied pixels of the partially occupied depth blocks and partially occupied attribute blocks, wherein the attribute values and depth values for the unoccupied pixels are extrapolated from attribute values or depth values of neighboring occupied pixels of the partially occupied blocks.

8. The non-transitory, computer-readable, medium of claim 7, wherein, the program instructions, when executed using the one or more processors, further cause the one or more processors to:

pack the sets of depth interval blocks generated for each the two or more depth intervals into an updated atlas and an updated depth map,
wherein the encoded attribute values, encoded depth values, and encoded transparency values correspond to the updated atlas and the updated depth map.

9. The non-transitory, computer-readable, medium of claim 1, wherein prior to generating the variable transparency layer, the program instructions, when executed using the one or more processors, further cause the one or more processors to:
determine one or more segments of the scene representing interior portions of objects with depth values that have a depth gradient less than a threshold amount;
generate one or more masks corresponding to the one or more segments;
for portions of the scene not included in the one or more segments, divide corresponding portions of the atlas and the depth map into blocks; and
for respective ones of the blocks comprising depth values falling within different ones of the two or more depth intervals:
generate a first depth block comprising pixels of the block of the depth map falling within a first one of the depth intervals and a corresponding attribute block comprising corresponding attribute pixels;
generate one or more additional depth blocks comprising pixels of the block of the depth map falling within one or more additional ones of the two or more depth intervals and one or more additional corresponding attribute blocks comprising corresponding attribute pixels; and
generate a corresponding variable transparency layer for each set of a plurality of sets comprising a depth block or additional depth block and corresponding attribute block or additional attribute block.

10. A device, comprising:
a memory storing program instructions; and
one or more processors, wherein the program instructions, when executed using the one or more processors, cause the one or more processors to:
generate based on a plurality of images of a three-dimensional (3D) scene:
an atlas comprising attribute values for views of the 3D scene;
a depth map comprising depth values for views of the 3D scene; and
a variable transparency layer comprising transparency values that indicate one or more boundaries of one or more objects in the 3D scene, wherein to generate the variable transparency layer, the program instructions, when executed using the one or more processors, cause the one or more processors to:
determine two or more depth intervals for the depth values of the depth map, wherein:
pixels of the depth map having depth values falling within a given one of the two or more depth intervals are included in the given depth interval; and
other ones of the pixels of the depth map having depth values falling within another one of the two or more depth intervals are included in the other depth interval; and
determine the transparency values for the transparency layer based on evaluating depth differences between pixels values included in a same one of the respective two or more depth intervals; and
encode the attribute values of the atlas, the depth values of the depth map, and the transparency values of the transparency layer.

11. The device of claim 10, further comprising:
a plurality of cameras configured to capture the plurality of images of the 3D scene from a plurality of camera viewing angles.

12. The device of claim 10, wherein the program instructions, when executed using the one or more processors, further cause the one or more processors to:
divide the atlas and the depth map into blocks; and
for respective ones of the blocks comprising depth values falling within different ones of the two or more depth intervals:
generate a first depth block comprising pixels of the block of the depth map falling within a first one of the depth intervals and a corresponding attribute block comprising corresponding attribute pixels;
generate one or more additional depth blocks comprising pixels of the block of the depth map falling within one or more additional ones of the two or more depth intervals and one or more additional corresponding attribute blocks comprising corresponding attribute pixels; and
generate a corresponding variable transparency layer for each depth interval set of a plurality of depth interval sets comprising a depth block or additional depth block and corresponding attribute block or additional attribute block.

13. The device of claim 12, wherein, the program instructions, when executed using the one or more processors, further cause the one or more processors to:
pack the sets of depth, attribute, and variable transparency layer blocks generated for each of the two or more depth intervals into an updated atlas and an updated depth map,
wherein the encoded attribute values, encoded depth values, and encoded transparency values correspond to the updated atlas and the updated depth map.

14. The device of claim 13, wherein prior to generating the variable transparency layer, the program instructions, when executed using the one or more processors, further cause the one or more processors to:
determine one or more segments of the scene representing interior portions of objects with depth values that have a depth gradient less than a threshold amount;
generate one or more masks corresponding to the one or more segments;
for portions of the scene not included in the one or more segments, divide corresponding portions of the atlas and the depth map into blocks; and
for respective ones of the blocks comprising depth values falling within different ones of the two or more depth intervals:
generate a first depth block comprising pixels of the block of the depth map falling within a first one of the depth intervals and a corresponding attribute block comprising corresponding attribute pixels;
generate one or more additional depth blocks comprising pixels of the block of the depth map falling within one or more additional ones of the two or more depth intervals and one or more additional corresponding attribute blocks comprising corresponding attribute pixels; and generate a corresponding variable transparency layer for each set of a plurality of sets comprising a depth block or additional depth block and corresponding attribute block or additional attribute block.

15. A method, comprising:

receiving images of a three-dimensional (3D) scene, wherein the images are captured from a plurality of camera viewing angles; and generating based on the received images:
- an atlas comprising attribute values for views of the 3D scene;
- a depth map comprising depth values for views of the 3D scene; and
- a variable transparency layer comprising transparency values that indicate one or more boundaries of one or more objects in the 3D scene, wherein said generating the variable transparency layer comprises:
  - determining two or more depth intervals for the depth values of the depth map, wherein:
    - pixels of the depth map having depth values falling within a given one of the two or more depth intervals are included in the given depth interval; and
    - other ones of the pixels of the depth map having depth values falling within another one of the two or more depth intervals are included in the other depth interval; and
  - determining the transparency values for the transparency layer based on evaluating depth differences between pixels values included in a same one of the respective two or more depth intervals; and encoding the attribute values of the atlas, the depth values of the depth map, and the transparency values of the transparency layer.

16. The method of claim 15, further comprising:

signaling the transparency values as alpha channel values to be used in an alpha compositing by a decoder to determine the one or more boundaries of the one or more objects in the 3D scene.

17. The method of claim 15, further comprising:

dividing the atlas and the depth map into blocks; and for respective ones of the blocks of the depth map comprising depth values falling within different ones of the two or more depth intervals:
- generating a first depth block comprising pixels of the respective block falling within a first one of the depth intervals and generate a corresponding attribute block for the first depth block, the corresponding attribute block comprising corresponding attribute pixels that correspond to pixels included in the first depth block;
- generating one or more additional depth blocks comprising pixels of the respective block falling within one or more additional ones of the two or more depth intervals and generate one or more additional corresponding attribute blocks for the one or more additional depth block, the one or more additional corresponding attribute blocks comprising corresponding attribute pixels that correspond to pixels included in the one or more additional depth blocks; and
- generating a corresponding variable transparency layer for each set of depth interval blocks of a plurality of sets of depth interval blocks, wherein each set of depth interval blocks comprises depth blocks or additional depth blocks for blocks of the depth map falling within a given depth interval and corresponding attribute block or additional attribute blocks for the depth blocks of the depth map falling within the given depth interval.

18. The method of claim 17, further comprising:

discarding one or more ones of the blocks of the atlas and depth map that are not occupied with pixels indicating a depth value or an attribute value.

19. The method of claim 17, wherein said generating the corresponding variable transparency layers for each set of the plurality of sets of depth interval blocks, comprises:

using a same transparency value for pixels of a variable transparency layer for blocks of a given depth interval that are fully occupied, wherein a fully occupied block comprises pixels indicating depth values or attribute values for an object in the 3D scene having depth values falling within the given depth interval and does not include unoccupied pixels in the given depth interval.

20. The method of claim 19, wherein said generating the corresponding variable transparency layers for each set of the plurality of sets of depth interval blocks, comprises:

using varying transparency values for blocks that are partially occupied with pixels indicating depth values or attribute values for an object in the 3D scene having depth values falling within the given depth interval, wherein the partially occupied blocks also include other unoccupied pixels.

* * * * *